(12) United States Patent
Steck

(10) Patent No.: US 10,655,279 B2
(45) Date of Patent: May 19, 2020

(54) RAILWAY MAINTENANCE SYSTEMS, TOOLS, AND METHODS OF USE THEREOF

(71) Applicant: Holland, L.P., Crete, IL (US)

(72) Inventor: Kelly Steck, Gig Harbor, WA (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 16/170,753

(22) Filed: Oct. 25, 2018

(65) Prior Publication Data

US 2019/0127924 A1 May 2, 2019

Related U.S. Application Data

(62) Division of application No. 14/809,045, filed on Jul. 24, 2015, now abandoned.

(60) Provisional application No. 62/030,163, filed on Jul. 29, 2014.

(51) Int. Cl.
| | | |
|---|---|---|
| *E01B 31/04* | (2006.01) | |
| *B23D 45/00* | (2006.01) | |
| *B23D 45/02* | (2006.01) | |

(52) U.S. Cl.
CPC ............ *E01B 31/04* (2013.01); *B23D 45/006* (2013.01); *B23D 45/021* (2013.01)

(58) Field of Classification Search
CPC ........ E01B 31/04; B23D 45/006; B23D 45/21
See application file for complete search history.

(56) References Cited

U.S. PATENT DOCUMENTS

| | | | | |
|---|---|---|---|---|
| 4,033,074 A | * | 7/1977 | Lutts .................... | B23D 45/006 451/347 |
| 4,203,582 A | * | 5/1980 | Hart ........................ | B25B 5/061 269/296 |
| 4,484,775 A | * | 11/1984 | Norkus ................ | B25J 15/0206 269/228 |
| 4,590,779 A | * | 5/1986 | Stange ................... | B21D 5/004 226/150 |
| 4,873,902 A | * | 10/1989 | Krieg ................... | B23D 45/006 83/745 |
| 5,687,627 A | * | 11/1997 | Wilson ................. | B23D 45/006 30/372 |

(Continued)

FOREIGN PATENT DOCUMENTS

| | | |
|---|---|---|
| DE | 29915801 U1 | 10/2000 |
| JP | H10-237803 A | 9/1998 |
| JP | 2015-086542 A | 5/2015 |

*Primary Examiner* — Omar Flores Sanchez
(74) *Attorney, Agent, or Firm* — Scherrer Patent & Trademark Law, P.C.; Stephen T. Scherrer; Monique A. Morneault

(57) ABSTRACT

A cold saw module may be a rail saw module that includes a cold saw configured to cut a railway rail along a cutting path, a rail alignment clamp configured to grip the railway rail near the cutting path, a feed actuator to drive the cold saw along the cutting path, and a module coupling element configured to selectively couple to a mating module coupling element of an articulated arm and/or a tool adapter. Cold saw modules may be used to cut metal workpieces such as a railway rail. Cutting a railway rail may include positioning the cold saw module at a cutting site along the railway rail installed in a railway, clamping the cold saw module to the railway rail, and cutting the railway rail at the cutting site with the cold saw module while the cold saw module is clamped to the cutting site.

20 Claims, 11 Drawing Sheets

(56) References Cited

U.S. PATENT DOCUMENTS 5,842,637 A * 12/1998 Lanzer .................. E01B 11/04
238/152
6,234,889 B1 * 5/2001 Huboud Peron .... B23D 45/006
125/12

* cited by examiner

RAILWAY MAINTENANCE SYSTEMS, TOOLS, AND METHODS OF USE THEREOF

RELATED APPLICATIONS

This application claims priority to U.S. patent application Ser. No. 14/809,045, titled "RAILWAY MAINTENANCE SYSTEMS, TOOLS, AND METHODS OF USE THEREOF," filed Jul. 24, 2015, which claims priority to U.S. Provisional Patent Application Ser. No. 62/030,163, entitled "RAILWAY MAINTENANCE SYSTEMS, TOOLS, AND METHODS OF USE THEREOF," which was filed on Jul. 29, 2014, the complete disclosure of which is hereby incorporated by reference for all purposes.

FIELD

The present disclosure relates to railway maintenance systems, tools, and methods of use thereof.

BACKGROUND

Railway maintenance is very important to successful and continued operation of a railway (also called a railroad). Railway tracks comprise at least two parallel rails, typically coupled to a series of sleepers (also called ties) and stabilized on a bed of ballast. With use and exposure to the elements, railway tracks may wear and move out of alignment. Worn, misaligned, and/or outdated track may be adjusted, aligned, and/or replaced. Such maintenance may include changing out broken track and defective rails, removing and reconstructing tracks, repairing switches, cutting rails, tightening and replacing track bolts (also called rail bolts), grinding rails (e.g., rail heads, switch points), welding rails, clipping rails, replacing sleepers, and/or reconfiguring ballast.

The challenge of maintaining a railway is exacerbated by recent trends of smaller windows of track time devoted to maintenance, a drive for more track up time, accelerated railway use, and a limited workforce. In particular, about 40% of the current railway workforce is projected to retire over the next 10 years, thus leading to a general decline in workforce experience.

Much railway maintenance is performed with gas or hydraulic hand tools which are heavy and cumbersome, thus limiting productivity. Hydraulic hand tools may present an added safety concern with hydraulic lines draped across a work site.

SUMMARY

A cold saw module may be a rail saw module that includes a cold saw configured to cut a railway rail along a cutting path, a rail alignment clamp configured to grip the railway rail near the cutting path, a feed actuator to drive the cold saw along the cutting path, and a module coupling element configured to selectively couple to a mating module coupling element of an articulated arm and/or a tool adapter. Cold saw modules may be used to cut metal workpieces such as a railway rail. Cutting a railway rail may include positioning the cold saw module at a cutting site along the railway rail installed in a railway, clamping the cold saw module to the railway rail, and cutting the railway rail at the cutting site with the cold saw module while the cold saw module is clamped to the cutting site.

DESCRIPTION

Figure 1:
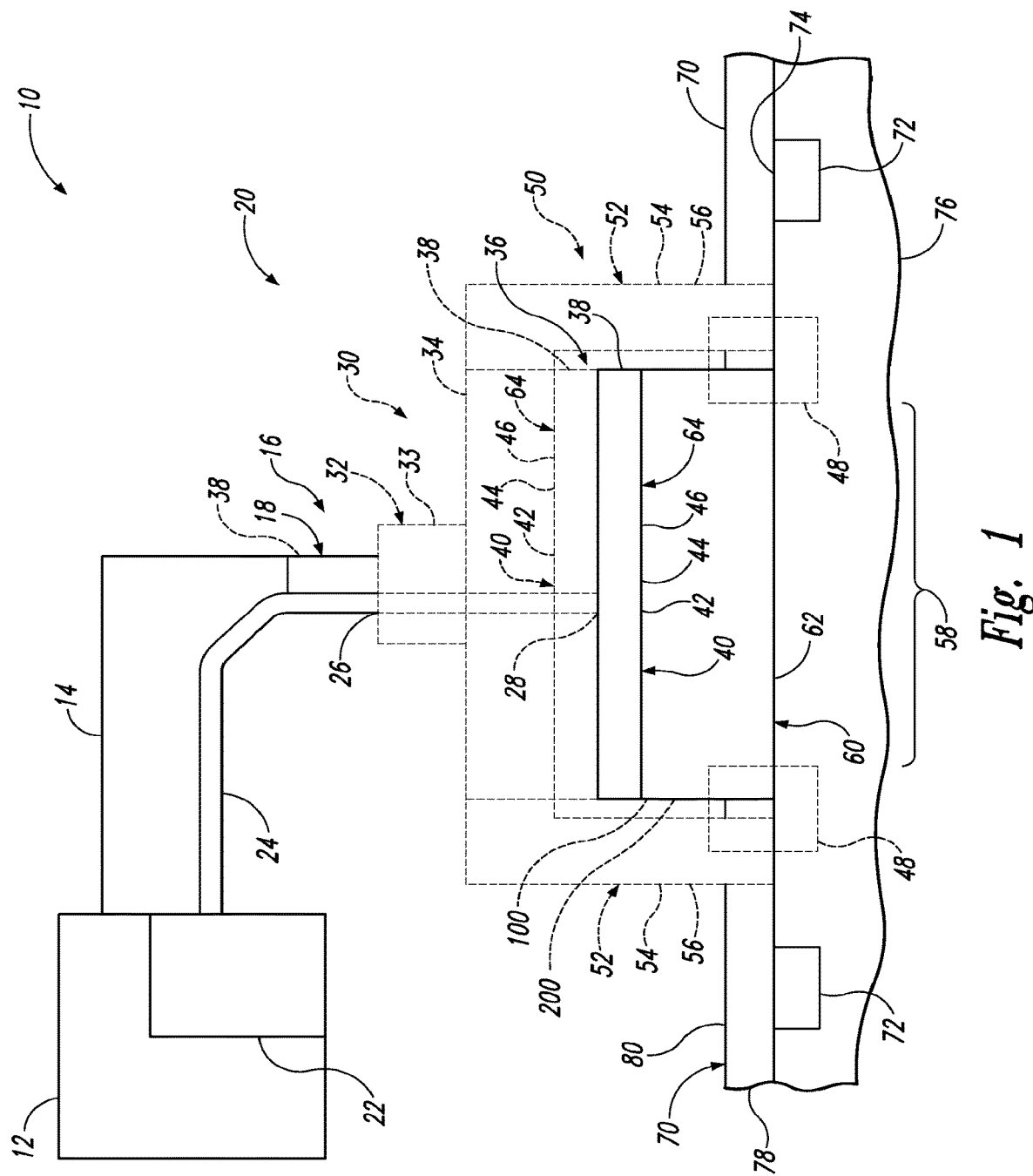
FIG. 1 is a schematic representation of systems for railway maintenance according to the present disclosure.

FIGS. 1-15 illustrate systems for railway maintenance, tool attachments, and methods of use. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 illustrates an overview of systems 10 according to the present disclosure. Systems 10 may be configured for railway maintenance and may be referred to as railway maintenance systems. Systems 10 may be used to maintain a railway, to repair a railway, and/or to replace a section of a railway, as described further herein.

Systems 10 comprise a tool attachment 20 (also called a railway maintenance tool attachment when configured and/or used for railway maintenance). The tool attachment 20 includes a tool module 60 and an optional tool adapter 30. The tool attachment 20 is configured to operate at the end of an articulated arm 14 such as a crane (as typically used for materials handling) and/or an excavator work group (the boom, arm, etc.). Articulated arms 14 typically are hydraulically powered and connected to a vehicle 12 (e.g., a truck, an excavator). The vehicle 12 may be adapted to travel on a railway and/or operate near a railway. Articulated arms 14 may have a base (typically coupled to a platform (e.g., vehicle) such as a truck bed or an excavator) and an end (typically configured to accept and exchange various types of attachments).

Though not a part of system 10, FIG. 1 also indicates the railway which comprises two parallel railway rails 70, sleepers 72 (also called ties) periodically spaced between the railway rails, clips 74 that bind the railway rails to the sleepers (bolts and/or spikes may be used in addition or in alternate to clips), and ballast 76 that forms a bed for the railway rails 70 and sleepers 72.

Systems 10 may comprise a power source 22 such as a hydraulic power source (e.g., including a hydraulic pump). The power source 22 may be operated by, and/or may be a component of, the vehicle 12. Additionally or alternatively, the power source 22 may operate independent of the vehicle 12 (and is not necessarily associated with the vehicle). For example, the power source 22 may be a component of the articulated arm 14 and/or the tool attachment 20. The same power source 22 may power one or more of the vehicle 12, the articulated arm 14, the tool attachment 20, the tool module 60, and the tool adapter 30. Additionally or alternatively, systems 10 may comprise a plurality of power sources 22, each of which may power different components of the system. Systems 10 may comprise power lines 24 that transmit power from the power source to the tool attachment 20 and/or to components thereof. Where the power source 22 is a hydraulic power source, the power lines 24 may be hydraulic lines, including a pressure line and a return line.

Articulated arms 14 commonly include an auxiliary hydraulic line to supply power to tools at the end of the articulated arm. The tool attachment 20 may be connected to the auxiliary power from the articulated arm 14 and/or to an auxiliary power source independent of the articulated arm 14 (e.g., an external hydraulic pump, a hydraulic power source on the vehicle).

Though discussed in terms of hydraulic control and power, tool attachments 20, tool modules 60, and/or tool adapters 30 may be powered by other power sources such as electrical power and/or mechanical power (e.g., from an internal combustion engine). Further, components of a tool attachment 20, components of a tool module 60, and/or components of a tool adapter 30 may be operated hydraulically while other components may be operated from another power source.

Figure 2:
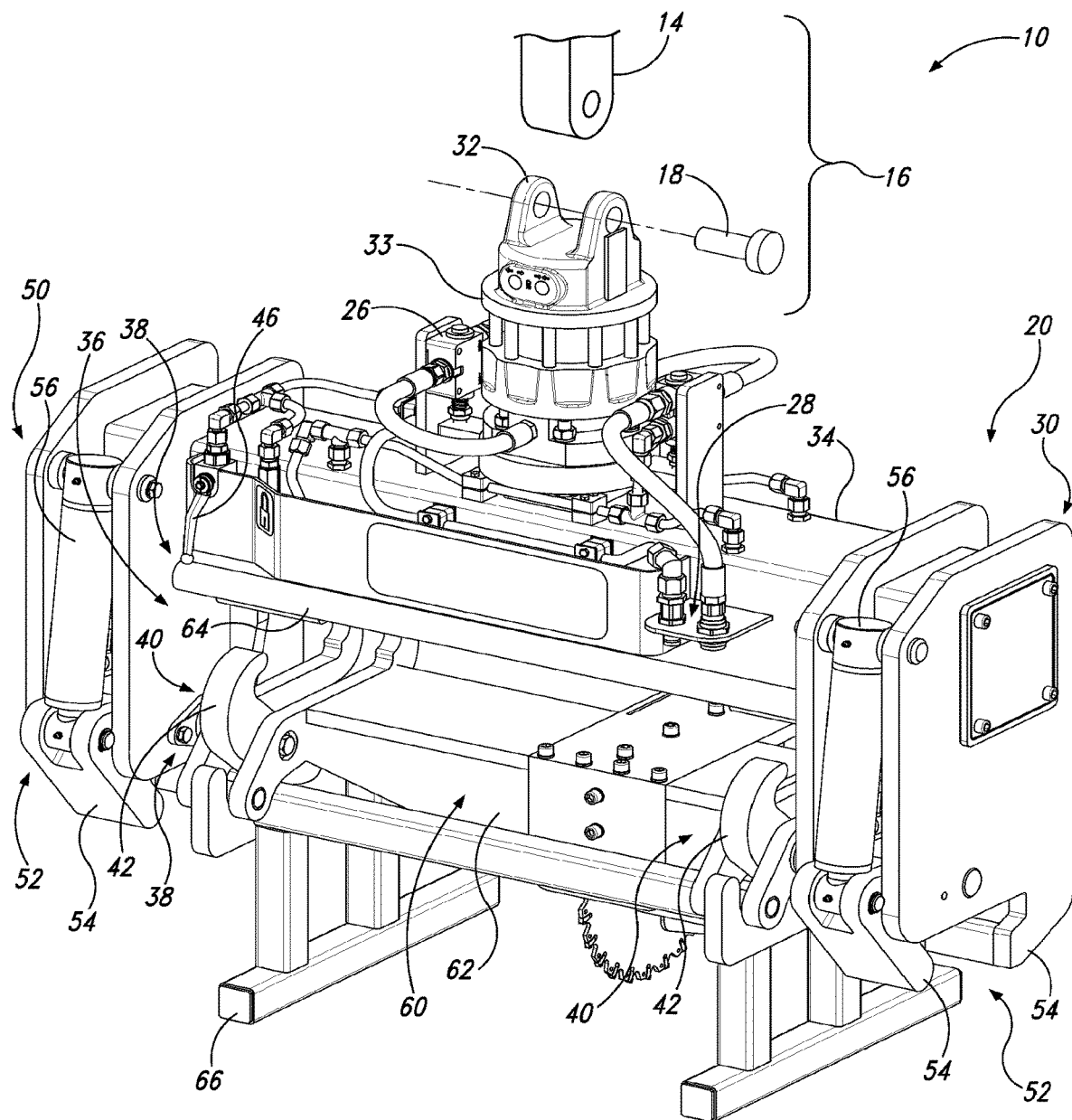
FIG. 2 is a perspective view of an example of a tool attachment in a system according to the present disclosure.

Systems 10 may be configured to selectively couple (e.g., to selectively connect and/or disconnect) tool attachments 20 to and/or from the articulated arm 14. Coupling the tool attachment 20 may include forming a strong, secure mechanical link between the articulated arm 14 and the tool attachment 20. The end of the articulated arm 14 may include an attachment coupling mechanism 18 that may be configured to mate to an arm coupling mechanism 32 (connected to the tool attachment 20). The combination of the attachment coupling mechanism 18 of the articulated arm 14 coupled (e.g., mated) to the arm coupling mechanism 32 of the tool attachment 20 forms an end coupling 16. Hence, systems 10 may include an end coupling 16, an example of which is shown in FIG. 2.

The end coupling 16, the attachment coupling mechanism 18, and/or the arm coupling mechanism 32 may be any suitable coupling mechanism to securely and/or selectively couple the tool attachment 20 to the articulated arm 14. For example, the end coupling 16, the attachment coupling mechanism 18, and/or the arm coupling mechanism 32 may include, and/or may be, a hitch, universal coupling mechanism, a yoke, a socket, a receiver, a pin, a clevis, a shackle, a plug, a knuckle, a hook, and/or a clamp. FIG. 2 illustrates an example end coupling 16 where the attachment coupling mechanism 18 includes a receiver and a pin, and where the arm coupling mechanism 32 includes a split yoke. The end coupling 16, the attachment coupling mechanism 18, and/or the arm coupling mechanism 32 may be configured to automatically and/or manually couple (e.g., connect and/or disconnect).

Tool attachments 20 may include powered components and may include an input power connector 26 configured to connect a power line 24. The input power connector 26 may be configured to connect the power line 24 when connecting the end coupling 16. Additionally or alternatively, the input power connector 26 may be independently connected and/or disconnected. For example, the input power connector 26 may be a pair of quick release hose connectors configured to connect hydraulic lines (e.g., at least a pressure line and a return line).

As seen in the schematic of FIG. 1 and the examples of FIGS. 2-6, tool attachments 20 may be configured to connect and/or to disconnect the tool adapter 30 to and/or from the tool module 60. Hence, the tool attachment 20 may include a module coupling 36, or a portion thereof, that is configured to selectively couple the tool module 60 to the articulated arm 14 and/or the tool adapter 30. The module coupling 36 may form a secure, strong mechanical link between the tool module 60 and one or both of the articulated arm 14 and the tool adapter 30.

Module couplings 36 include at least one module coupling element 38 coupled to the tool module 60 and at least one mating module coupling element 38 coupled to the tool adapter 30, if present, and/or to the articulated arm 14. Module coupling elements 38 may include one or more module clamps 40, a component thereof, and/or a module coupling structure 64. Generally, module coupling elements 38 of the module coupling 36 include a module clamp 40 (one of the module coupling elements 38) and a mating module coupling structure 64 (another of the module coupling elements 38). Module clamps 40 are configured to grip the mating module coupling structure 64 to couple the tool module 60 to the articulated arm 14 and/or the tool adapter 30. Likewise, module coupling structures 64 are configured to be gripped by the mating module clamp 40 to couple the tool module 60 to the articulated arm 14 and/or the tool adapter 30.

Module clamps 40 include a module clamp actuator 44 and at least two opposing module clamp jaws 42. The module clamp actuator 44 may include, and/or may be, a hydraulic cylinder. At least one of the module clamp jaws 42 is mobile, typically pivotably coupled to the tool module 60, the tool adapter 30, and/or the articulated arm 14. Module couplings 36, module coupling elements 38, and/or module clamps 40 may include a module lock 46 that may be configured to lock the module coupling 36, the module coupling element 38, and/or the module clamp 40 in an open position and/or a closed position. For example, the module lock 46 may be a valve that forbids or permits fluid flow from a hydraulic actuator associated with the module clamp 40.

Figure 3:
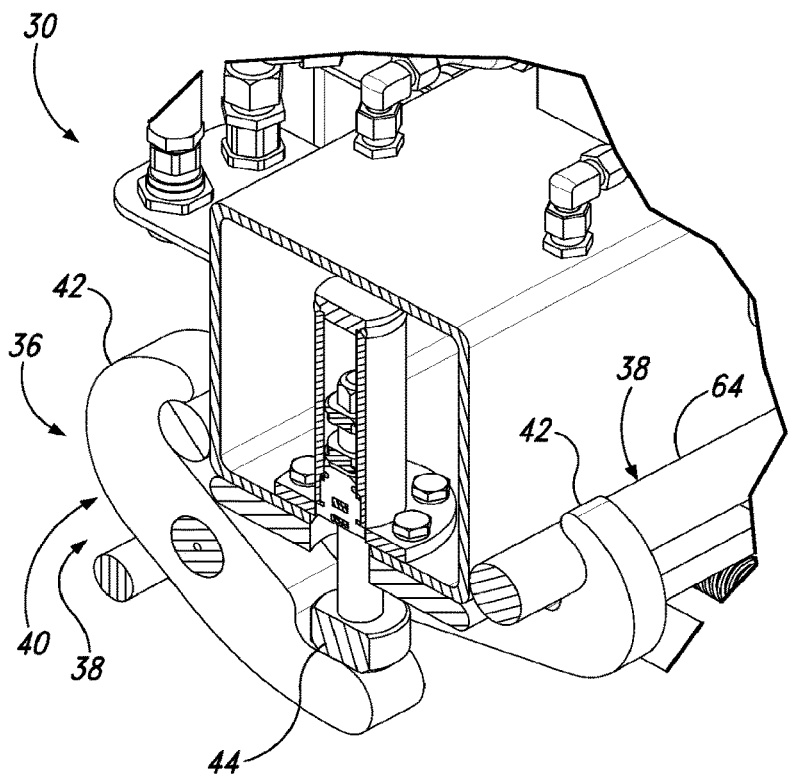
FIG. 3 is a cut-away view of the tool attachment of FIG. 2 showing the components of an example module coupling.

In the example of FIGS. 2-3, the tool module 60 includes a module coupling element 38 that includes two longitudinally spaced pairs of module clamps jaws 42. The module clamp jaws 42 are configured to grip a mating module coupling element 38 on the tool adapter 30. The mating module coupling element 38 of the tool adapter 30 includes two parallel, longitudinal module coupling structures 64. The mating module coupling element 38 of the tool adapter 30 also includes a module clamp actuator 44 (as seen in the cut away view of FIG. 3) for each pair of module clamp jaws 42 of the tool module 60. Each module clamp actuator 44 is configured to cause the corresponding module clamp jaws 42 to engage and to grip the module coupling structures 64 of the tool adapter 30. Thus, the module coupling elements 38 together define two module clamps 40, with the module clamp jaws 42 on the tool module 60 and the module clamp actuators on the tool adapter 30. In this example, both module clamp jaws 42 of both module clamps 40 are mobile and pivotably coupled to the tool module 60.

Figure 4:
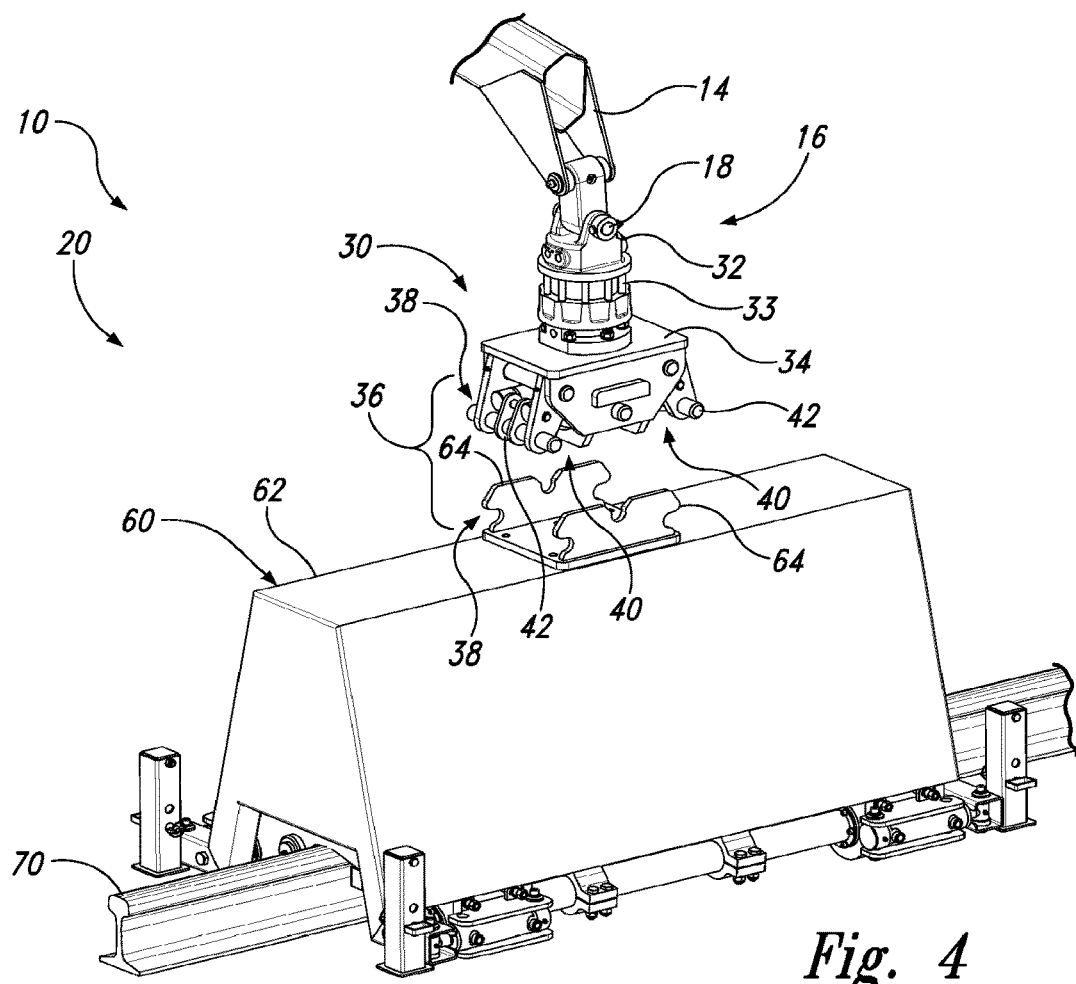
FIG. 4 is a perspective view of another example module coupling.

In the example of FIG. 4, the tool adapter 30 includes a module coupling element 38 that includes two longitudinally spaced module clamps 40. The module clamps 40 are configured to grip a mating module coupling element 38 on the tool module 60. The mating module coupling element 38 of the tool module 60 includes two module coupling structures 64. The module clamps 40 grip by hooking one of the module clamp jaws 42 in a notch of the module coupling structures 64.

Figure 5:
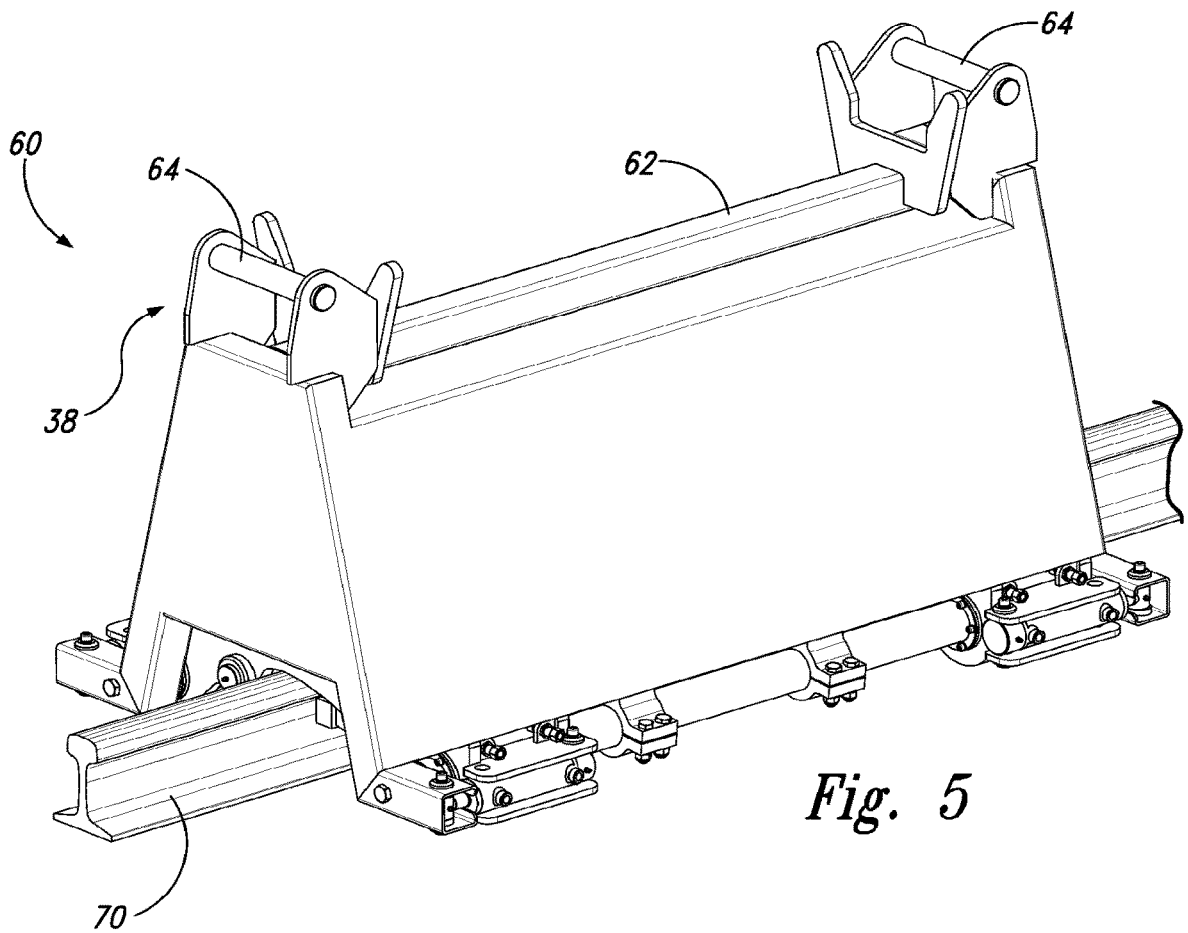
FIG. 5 is a perspective view of yet another example module coupling.

In the example of FIG. 5, the tool module 60 includes a module coupling element 38 that includes two longitudinally spaced-apart module coupling structures 64 in the form of transversely aligned rods. The transversely aligned rods are configured to be gripped and/or supported by a mating module coupling element 38 of the tool adapter 30 and/or the articulated arm 14 (not shown). For example, the mating module coupling element may include hooks and/or module clamps.

Figure 6:
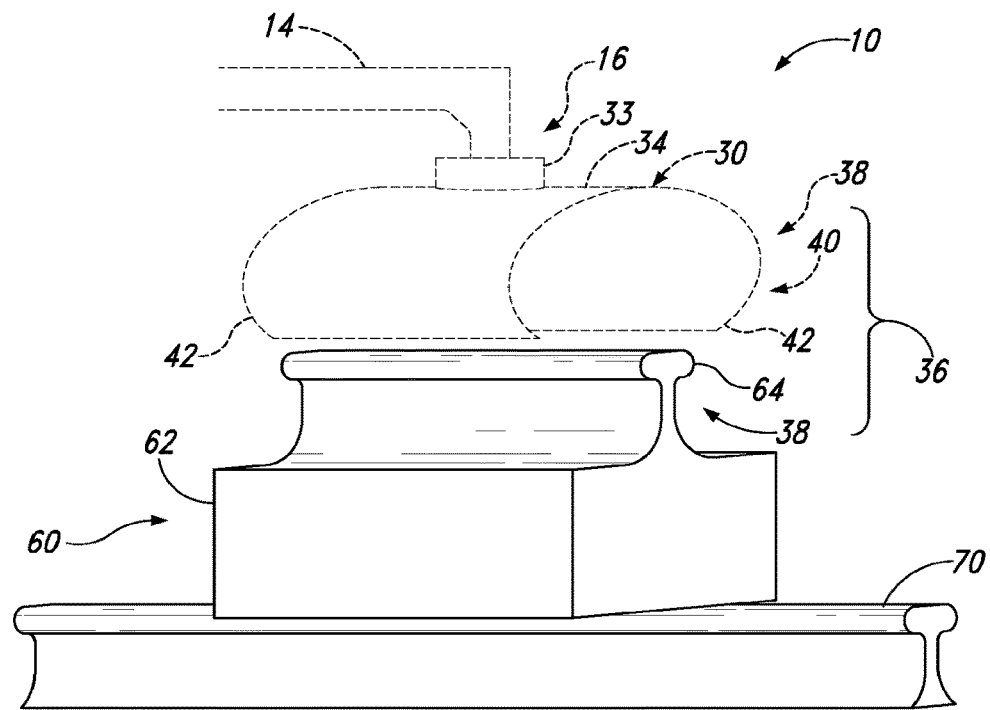
FIG. 6 is a perspective view of a further example module coupling.

In the example of FIG. 6, the tool module 60 includes a module coupling element 38 that includes a module coupling structure 64 formed with a railway rail profile. The rail-profile module coupling structure 64 is configured to be gripped by a mating module coupling element 38 on the tool adapter 30 and/or the articulated arm 14. For example, the mating module coupling element 38 may be configured to grip a railway rail (e.g., the mating module coupling element 38 may be a rail handler and/or a rail gripper). As another example, the tool adapter 30 may be a rail handler and/or a rail gripper. Additionally or alternatively, a tool adapter 30 that includes a module clamp 40 configured to grip a railway rail may be used to grip and/or manipulate a railway rail and/or a mating tool module 60 that includes a rail-profile module coupling structure 64.

Articulated arms 14, tool attachments 20, and/or tool adapters 30 may include multiple module couplings 36. The different module couplings 36 may be configured to couple multiple tool modules 60 simultaneously, to couple different tool modules 60 in different locations and/or orientations, and/or to couple different types of tool modules 60.

Returning to the general discussion of the schematic of FIG. 1 and the example of FIG. 2, tool adapters 30 may include a frame 34 that is configured to support and/or connect other components of the tool adapter 30. For example, the frame 34 may be coupled to and/or be configured to support, the arm coupling mechanism 32, the module coupling 36, at least one of the module coupling elements 38, and/or the tool module 60.

Tool adapters 30 may include a rail handler 50. The rail handler 50, when present, may be integrated with the tool adapter 30, remaining with the tool adapter 30, and may remain functional, when the tool module 60 is coupled to the tool adapter 30. Additionally or alternatively, the rail handler may be used to grip a suitably configured tool module 60 such as the example tool module of FIG. 6. Rail handlers 50 may be coupled, directly or indirectly, to the tool adapter 30 via the frame 34.

Rail handlers 50 are configured to grasp the railway rail 70 of a railway and/or a railway rail to be used on a railway. Rail handlers 50 may be configured to grip the railway rail 70 across the web 78 of the railway rail and below the head 80 of the railway rail. The top surface of the head 80 of the railway rail 70 may be dimensionally variable, e.g., due to wear and/or different designs of the railway rail. Similarly, the sides of the head 80 may be worn by use and/or have different shapes based on design. The web 78 and head 80 are common features in railway rail designs and the web 78 and the underside of the head 80 tend to remain relatively intact despite wear from use by trains. Further, rail handlers 50 may be configured to grasp a range of designs and/or sizes of railway rails 70 (e.g., high profile rails, low profile rails, flat bottomed rails, bullhead rails, conductor rails, etc.) without adjustment.

Rail handlers 50 include at least one, typically at least two, rail clamp(s) 52. Each rail clamp 52 is configured to grip the railway rail 70 and may be configured to grip the railway rail across the web 78 and/or under the head 80. Where a rail handler 50 includes a plurality of rail clamps 52, the rail clamps typically are spaced longitudinally and configured to grip the same railway rail 70. Additionally or alternatively, plural rail clamps 52 may be spaced transversely and configured to grip substantially parallel railway rails (e.g., gripping the parallel railway rails of a railway). The rail handler 50 may be configured to operate the rail clamps 52 cooperatively and/or independently. Hence, two or more rail clamps 52 may simultaneously grip one railway rail 70, and/or simultaneously grip two or more railway rails 70.

Each rail clamp 52 includes a rail clamp actuator 56 and at least two opposing rail clamp jaws 54. The rail clamp actuator 56 may include, and/or may be, a hydraulic cylinder. The rail clamp actuator 56 may be configured to apply up to 1 ton-force (9.8 kN (kilonewtons)), up to 2 ton-force (20 kN), up to 4 ton-force (39 kN), up to 8 ton-force (78 kN), greater than 0.1 ton-force (1 kN), greater than 1 ton-force (9.8 kN), and/or greater than 8 ton-force (78 kN). At least one of the opposing rail clamp jaws 54 is mobile, and may be pivotably coupled to the frame 34. The mobile rail clamp jaw 54 and the rail clamp 52 generally are configured to engage and disengage the railway rail 70.

Figure 7:
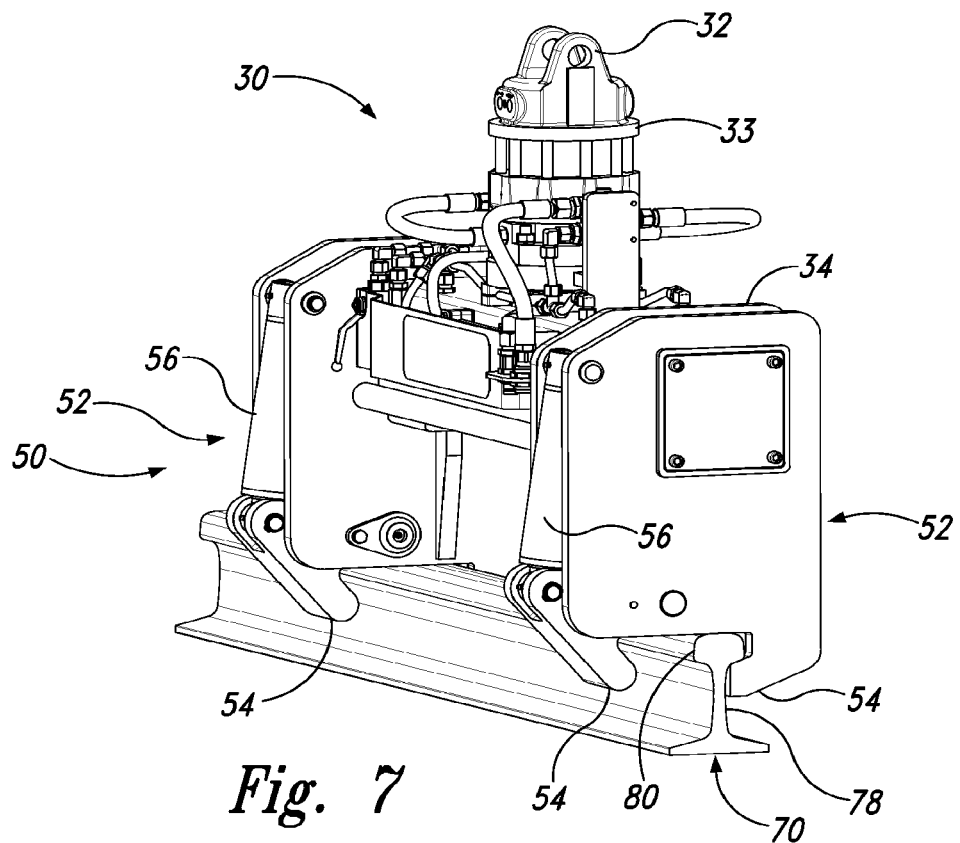
FIG. 7 is a perspective view of an example tool adapter with a rail handler in a disengaged configuration.
Figure 8:
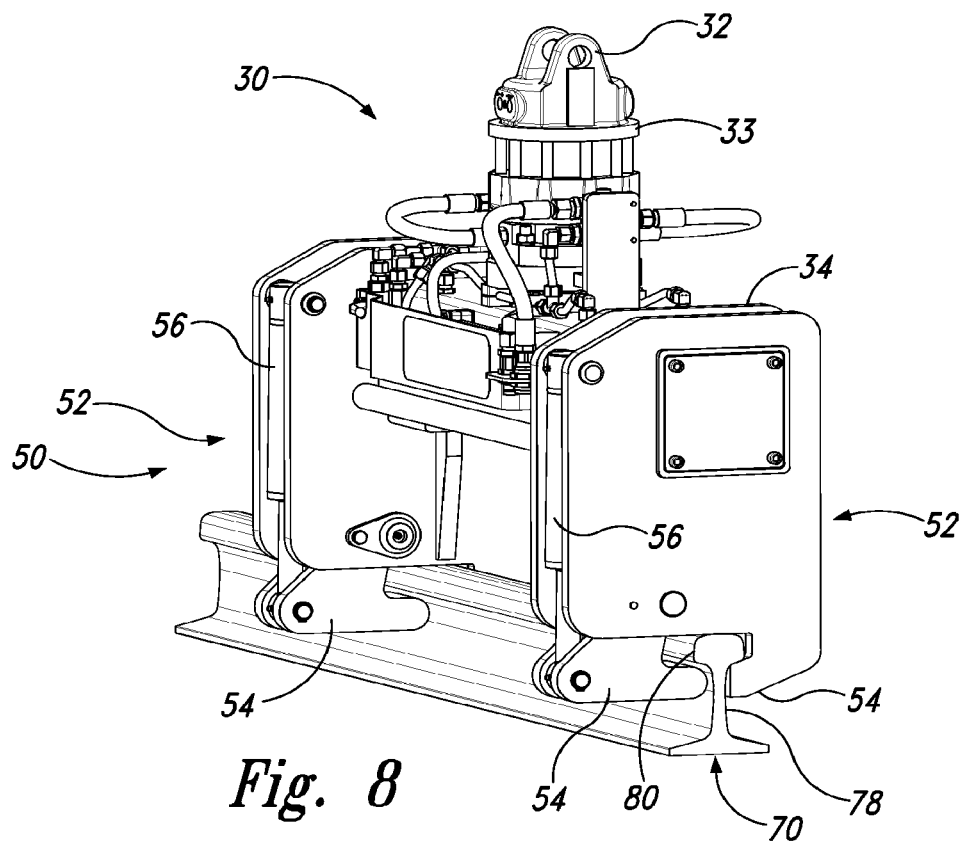
FIG. 8 is a perspective view of the tool adapter of FIG. 7 with the rail handler in an engaged configuration.

FIGS. 7-8 show the operation of an example rail handler 50. The two rail clamps 52 are longitudinally spaced and configured to grip a single railway rail. In the example of FIGS. 7-8, the rail clamp actuators 56 are hydraulic cylinders. Each rail clamp 52 includes a mobile rail clamp jaw 54 (indicated with dot-dash lead lines) and a stationary rail clamp jaw 54 (indicated with solid lead lines). In FIG. 7, the rail handler 50 is in a disengaged configuration and the mobile rail clamp jaws 54 are shown in a disengaged position. In FIG. 8, the rail handler 50 is in an engaged configuration and the mobile rail clamp jaws 54 are shown in an engaged position.

Returning to the general discussion of the schematic of FIG. 1 and the example of FIG. 2, tool adapters 30 may define a tool area 58 along and/or around a section of railway rail 70 (as represented in FIG. 1). The tool area 58 generally is open space for the tool module 60 to operate. The tool area 58 may be defined between two rail clamps 52 which together comprise the rail handler 50 of the tool adapter 30.

Tool adapters 30 may include a rotator 33. The rotator 33 is connected to, and is configured for relative rotational motion between, the frame 34 and the arm coupling mechanism 32. The rotator 33 is configured to rotate the frame 34 independent of the arm coupling mechanism 32 and/or the articulated arm 14 connected to the tool adapter 30. The rotator 33 may be a powered rotator, e.g., hydraulically powered. Additionally or alternatively, the articulated arm 14 may be configured to rotate the tool adapter 30 (e.g., about and/or with the end coupling 16).

Power may be coupled from the tool adapter 30 to the tool module 60. The tool adapter 30 and/or the tool module 60 may include a module power connector 28 configured to connect a power line 24. The module power connector 28 may be configured to connect the power line 24 when connecting the module coupling 36. Additionally or alternatively, the module power connector 28 may be independently connected and/or disconnected. For example, the module power connector 28 may be a pair of quick release hose connectors configured to connect hydraulic lines (e.g., at least a pressure line and a return line), as shown in the example of FIG. 2. Further, the tool adapter 30 may include the input power connector 26, which may be configured to supply and/or direct power to the tool adapter 30, and to the module power connector 28, which may be configured to supply and/or direct power to the tool module 60.

Tool attachments 20, tool adapters 30 and/or tool modules 60 may be configured to be supported next to and/or by a railway and may be configured to roll on the railway. For example, tool adapters 30 and/or tool modules 60 may include feet structures 48 (also called support structures) configured to support the tool adapter 30. The feet structures 48 may be configured to support the tool adapter 30 and/or the tool modules 60 on the ground, on the ballast, and/or on the railway (e.g., on one or more railway rails 70). The feet structures 48 may include wheels and/or casters configured to roll on the ground and/or on the railway. For example, feet structures 48 and/or wheels may include at least one flange configured to engage the head of the railway rail 70.

Systems 10 and tool attachments 20 include the tool module 60. Tool modules 60 also may be referred to as railway maintenance tools when configured and/or used for railway maintenance. Systems 10 and/or tool attachments 20 may be configured to exchange tool modules 60 by connecting and/or disconnecting the end coupling 16 and/or the module coupling 36. Hence, systems 10 may include a plurality of tool modules 60.

Tool modules 60 are machine tools that are configured for operation from the end of the articulated arm 14 and configured to selectively couple with (e.g., to connect to and to disconnect from) the articulated arm 14, and/or the tool adapter 30 (e.g., with the end coupling 16 and/or the module coupling 36). Tool modules 60 may be operated remotely (e.g., via cabled, hydraulic, and/or radio-linked controls located apart from the tool module).

Tool modules 60 include a frame 62 and a module coupling element 38 of the module coupling 36. The frame 62 is configured to support and/or connect other components of the tool module 60. For example, the frame 62 may be coupled to, and/or may be configured to support, the module coupling 36, at least one of the module coupling elements 38, the module clamp 40, the module coupling structure 64, the module clamp actuator 44, and/or module clamp jaw(s) 42. The frame 62 may be configured to span a length of the railway rail 70.

Tool modules 60 may be configured to perform one or more rail maintenance operations such as cutting rails, manipulating rails, setting rails, setting sleepers, securing rails, welding rails, grinding rails, tamping ballast, removing ballast, and/or replacing ballast. For example, the tool module 60 may be, and/or may include, a rail saw, a sparkless rail saw, a rail handler, a spike driver, a spike puller, a sleeper tamper, a sleeper exchanger, a clipping tool, a clip installer, a clip remover, a rail bolter, a rail drill, a sleeper drill, a weld alignment tool, a thermite weld installer, a rail mill, a switch mill, a ballast plow, and a ballast broom. Additionally or alternatively, tool modules 60 may be configured for operation in other settings. For example, a tool module 60 may be a mobile saw module (as discussed further herein) that may be adapted for cutting metal structures (workpieces) at a field site in industrial and/or construction settings. The workpieces may be elongated and/or may be a beam (e.g., an I-beam), a rail, a rod, a plate, a tube, a pipe, and/or conduit.

Systems 10 also may include a storage cradle 66 (as shown in FIG. 2) configured to support the tool attachment 20, the tool adapter 30, and/or the tool module 60 when not in use and/or when not connected to the articulated arm 14 or other components of the system 10.

Figure 9:
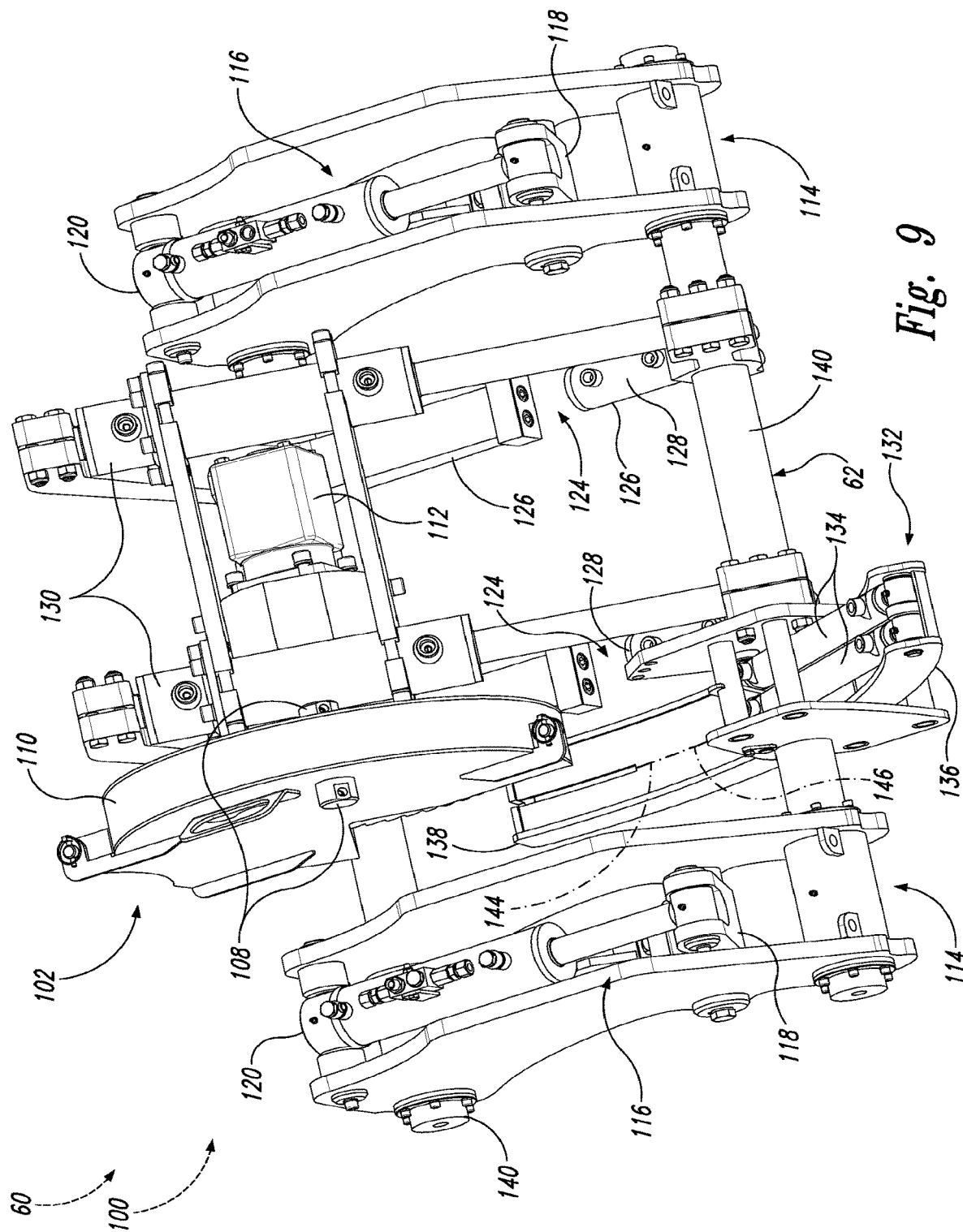
FIG. 9 is a top perspective view of an example saw tool module.
Figure 10:
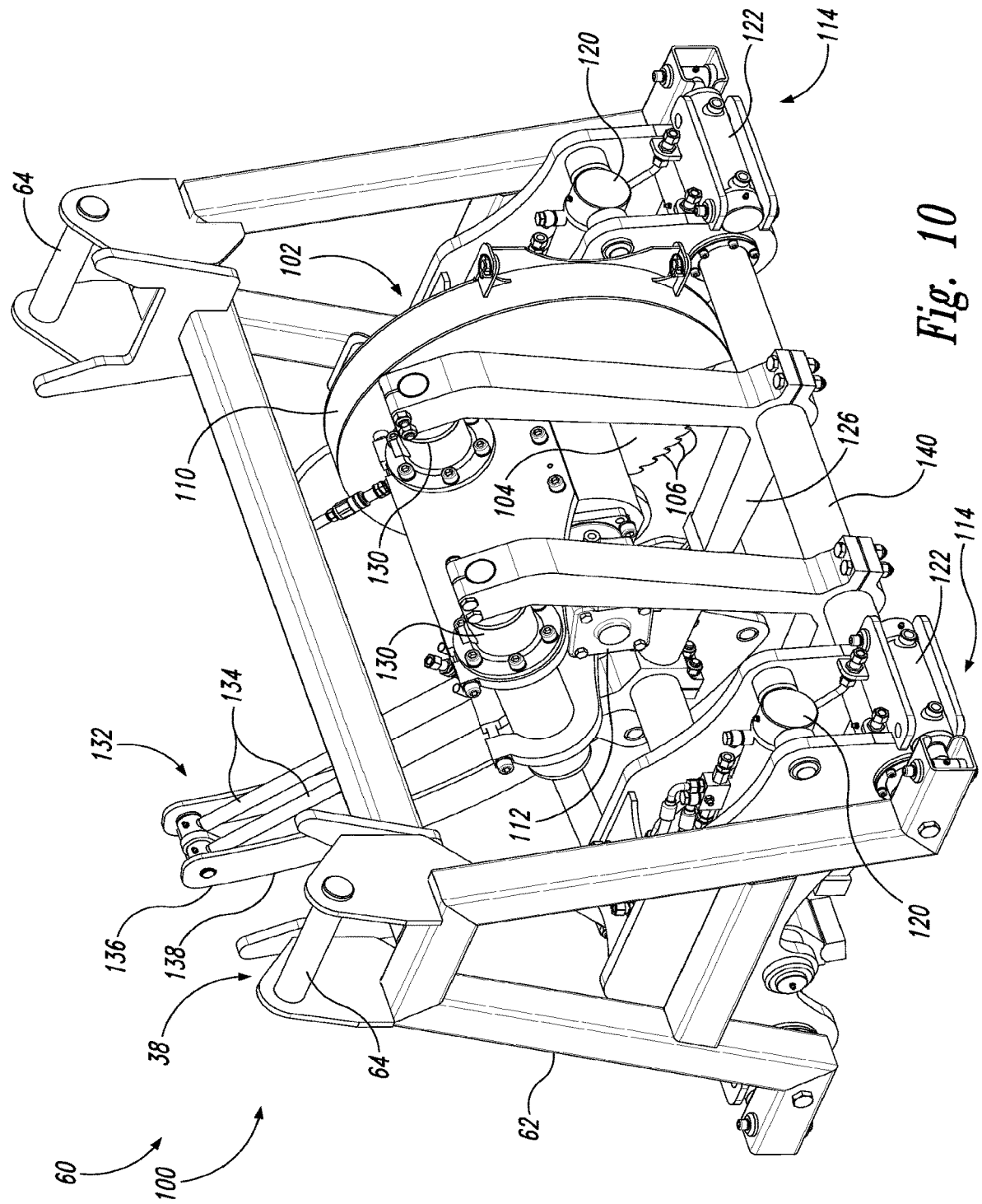
FIG. 10 is a back perspective view of an example saw tool module.
Figure 11:
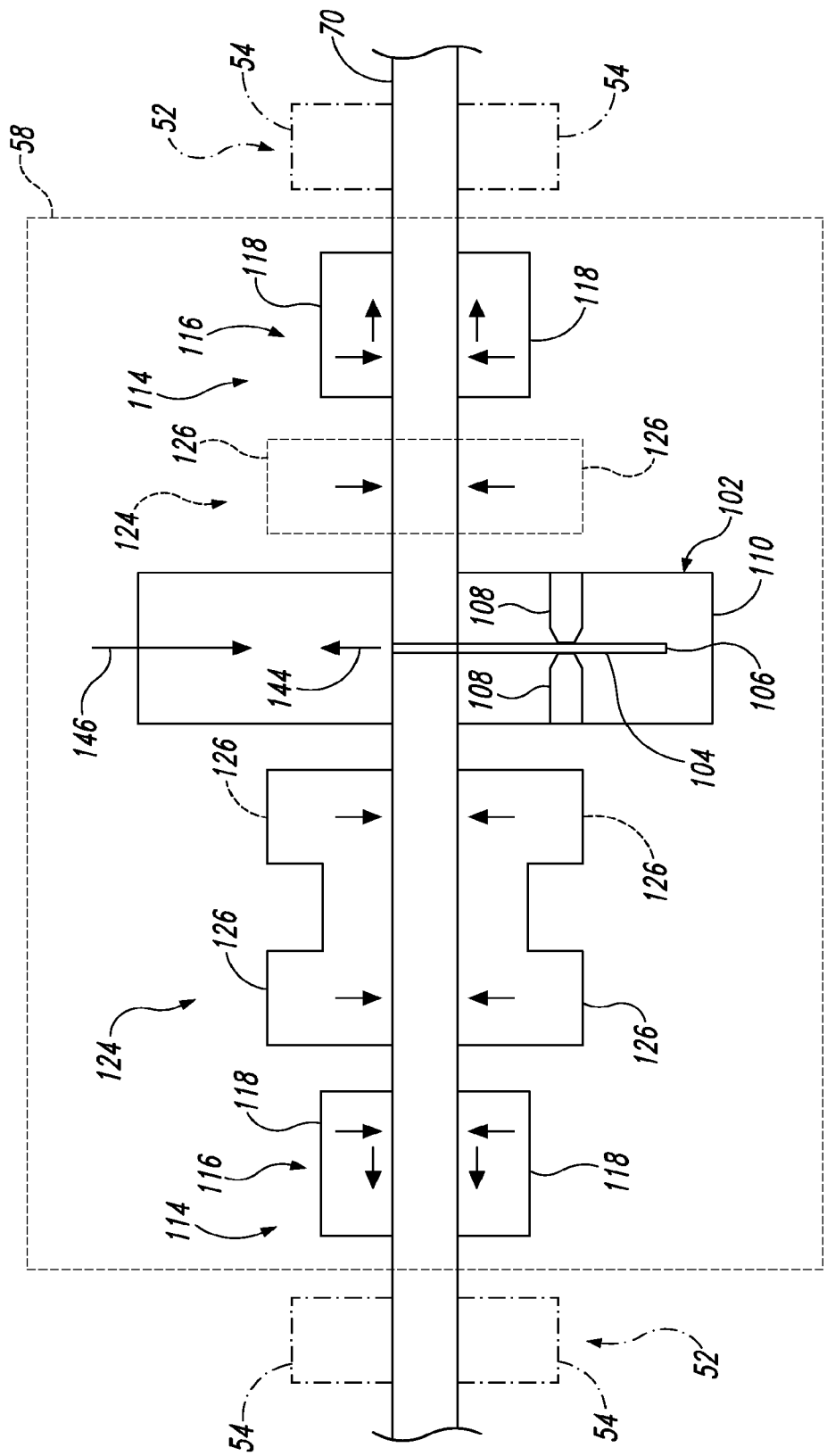
FIG. 11 is a schematic representation of an example configuration of saw tool module components spaced along a railway rail.

FIGS. 9-11 show various views and aspects of one particular type of tool module 60, namely, a saw module 100 (also called a rail saw module when configured and/or used to cut railway rails). Saw modules 100 are configured to cut a metal workpiece (e.g., the railway rail), typically at a field site and/or as installed at a field site. For example, saw modules 100 may be configured to cut a railway rail as installed in a railway (as shown in the examples of FIGS. 9-11). Saw modules 100 may be configured to cut out a section of railway rail from a railway and/or to cut out a section of railway (e.g., cutting out two parallel sections of railway rails). Typically, the saw module 100 is configured to cut the metal workpiece transversely (e.g., substantially perpendicular to a longitudinal and/or elongated direction of the metal workpiece). For example, the saw module 100 may be configured to cut the railway rail transversely (e.g., substantially perpendicular to the longitudinal direction of the railway rail). Saw modules 100 are configured to cut the metal workpiece along a cutting path 144 (as seen in FIGS. 9 and 11, also called a feed path). Hence, the cutting path 144 is transverse to the metal workpiece (e.g., substantially perpendicular to the longitudinal direction and/or elongated direction of the (elongated) metal workpiece). Saw modules 100 include a saw 102, which may be a sparkless saw, a cold saw, and/or an abrasive saw. Saws 102 may be a form of a rotary saw, a circular saw and/or a disc cutter and may include a saw blade 104 (e.g., circular saw blade, a cold saw blade, and/or an abrasive saw blade).

While abrasive saws cut by grinding and/or abrading, and thus produce sparks when cutting steel rails, cold saws cut by shearing and/or chipping. The process of cold sawing generally transfers the heat generated by the cutting into the swarf (e.g., chips) rather than primarily the workpiece and/or the saw blade. The cold sawing process generally leaves the cut workpiece relatively cool and produces minimal burr, no sparks, no discoloration, and/or no dust. Cold sawing is characterized by low speed, high torque cutting using a hard saw blade configured for a high chip load per tooth.

Saws 102 include a blade motor 112 that is configured to rotate the saw blade 104. Blade motors 112 may be low speed, high torque motors and may be hydraulic and/or electrically driven. Saws 102, in particular saws with electrically-driven motors, generally include gearing to achieve a sufficiently low blade speed. Suitable rotational speeds for the saw blade 104 and/or the blade motor 112 include less than 500 RPM (revolutions per minute), less than 200 RPM, less than 100 RPM, less than 80 RPM, less than 50 RPM, less than 30 RPM, greater than 10 RPM, greater than 20

RPM, greater than 30 RPM, greater than 50 RPM, and/or greater than 80 RPM. Saws 102, saw blades 104, and/or blade motors 112 may be configured to rotate the saw blade, and/or cut the metal workpiece, at a speed of at least 30 SMPM (surface meters per minute), at least 50 SMPM, at least 80 SMPM, at least 100 SMPM, at least 150 SMPM, at most 300 SMPM, at most 200 SMPM, at most 150 SMPM, at most 100 SMPM, at most 80 SMPM, and/or at most 50 SMPM. The measure of surface meters per minute is the rotational speed of the saw blade 104 times the circumference of the saw blade. Suitable saw blade diameters include at least 200 mm, at least 300 mm, at least 500 mm, at least 700 mm, at most 1000 mm, at most 800 mm, at most 600 mm, and/or at most 400 mm.

Cold sawing results also are affected by the type and configuration of the saw blade 104. Saw blades 104 may be a cold saw blade, a carbide-tipped saw blade, and/or a cermet-tipped saw blade. Carbide refers to a carbide compound generally and may refer to a tungsten carbide compound. Cermet refers to a ceramic-metal composite material. Saw blades 104 may be composed substantially of at least one of steel, high speed steel, hardened steel, tungsten carbide, a carbide, and ceramic. Saw blades 104 may include a plurality of teeth 106 and the teeth may be composed substantially of at least one of steel, high speed steel, hardened steel, tungsten carbide, a carbide, cermet, cermeted carbide, and cobalt. Teeth 106 may include a wear-resistant coating and/or a dry lubricant coating such as at least one of a nitride, titanium nitride, titanium carbon nitride, titanium aluminum nitride, and titanium aluminum carbon nitride.

Flexure of the saw blade 104 may cause a poor cut and/or lead to damage to the saw blade, the saw 102 and/or the metal workpiece (e.g., the railway rail). Saws 102 may include one or more pairs of blade truing rollers 108 that are configured to maintain the shape of the saw blade 104 during cutting and/or to limit flexure within the saw blade during cutting. Blade truing rollers 108 may contact the saw blade 104 while the saw blade is spinning and/or cutting.

Blade truing rollers 108 may apply transverse forces to the saw blade 104 to keep the teeth 106 of the saw blade 104 aligned with the cutting path 144.

Saws 102 may include a saw guard 110 configured to cover the saw blade 104 and to protect the saw blade, personnel, and/or equipment from harm.

Saw modules 100 include the frame 62 that may include one or more alignment rails 140. The frame 62 of the saw module 100 is configured to support and/or connect other components of the saw module 100.

In the examples of FIGS. 9-10, two alignment rails 140 are included in the frame 62. The alignment rails 140 may be configured to be aligned parallel to an elongated metal workpiece (e.g., the railway rail) when the saw module 100 is engaged with the railway rail. Thus, the alignment rails 140 may be aligned longitudinally. The cutting path 144 of the saw 102 is substantially perpendicular to the elongated metal workpiece and, hence, the cutting path 144 may be substantially perpendicular to the alignment rail(s) 140. Where a saw module 100 includes more than one alignment rail 140, the alignment rails generally are substantially parallel and spaced apart. In the example of FIG. 10, the frame 62 is an A-frame configuration with one alignment rail 140 at each base of the A-frame, configured to locate one alignment rail on either side of the railway rail.

Saw modules 100 may include a feed actuator 130 that is configured to drive the saw 102 and/or the saw blade 104 along the cutting path 144, and, hence, substantially perpendicular to the metal workpiece being cut and/or the alignment rail(s) 140. The feed actuator 130 may include, and/or may be, a hydraulic cylinder. The feed actuator 130 may be configured to move the saw 102 and/or the saw blade 104 while the saw is operating (e.g., spinning and/or cutting the metal workpiece). The feed actuator 130 may be configured to move the saw 102 and/or the saw blade 104 at a substantially constant velocity along the cutting path 144.

Saw modules 100 may include one or more rail alignment clamps 124 configured to grip a railway rail near the cutting path 144 (near being typically within about one equivalent saw blade diameter). Saw modules 100 may include at least two, or more, rail alignment clamps 124. Saw modules 100 may include at least one rail alignment clamp 124 on each side of the cutting path 144. For example, the saw module 100 may include two rail alignment clamps 124, each on opposite sides of the cutting path 144. Each rail alignment clamp 124 may be spaced apart from the cutting path 144. Multiple rail alignment clamps 124, if present, may be spaced apart longitudinally along the railway rail and/or may be configured to grip the railway rail at longitudinally spaced apart points along the railway rail. At least one (optionally all) of the rail alignment clamps 124 may be configured to grip the railway rail within 100 mm, 200 mm, 300 mm, or 500 mm of the cutting path 144. Where saw modules 100 include at least one rail alignment clamp 124 on each side of the cutting path 144, the nearest rail alignment clamp 124 on each side may be configured to grip the railway rail within 100 mm, 200 mm, 300 mm, or 500 mm of the cutting path 144. Additionally or alternatively, rail alignment clamps 124 may be alignment clamps configured to grip the metal workpiece near the cutting path 144.

For high torque operation, the metal workpiece, the saw 102, and/or the saw module 100 may experience forces significant enough to deviate, jostle, bump, and/or kick the saw blade 104 from the desired cutting path 144. Some saw blades 104 and teeth 106, especially hard saw blades and/or teeth, may be damaged by even small motions, vibrations, and/or deviations from the desired cutting path 144. Rail alignment clamps 124 may be configured to grip the metal workpiece tight enough to significantly prevent relative motion of the saw blade 104 and the metal workpiece (except for the rotational cutting motion of the saw blade 104 and the feed motion driven by the feed actuator 130). Additionally or alternatively, at least one rail alignment clamp 124, individually, and/or at least two (optionally all) of the rail alignment clamps 124, collectively, may be configured to align (and/or maintain the alignment of) the cutting path 144 substantially perpendicular (e.g., essentially perpendicular) to the railway rail (metal workpiece) while the respective rail alignment clamp 124 grips the railway rail (metal workpiece).

Rail alignment clamps 124, analogous to rail clamps 52 of the rail handler 50, include a rail alignment clamp actuator 128 and at least two opposing rail alignment clamp jaws 126. The rail alignment clamp actuator 128 may include, and/or may be, a hydraulic cylinder. The rail alignment clamp actuator 128 may be configured to apply up to 2 ton-force (20 kN), up to 5 ton-force (49 kN), up to 10 ton-force (98 kN), up to 20 ton-force (200 kN), up to 40 ton-force (390 kN), greater than 1 ton-force (9.8 kN), greater than 5 ton-force (49 kN), and/or greater than 40 ton-force (390 kN). At least one of the opposing rail alignment clamp jaws 126 is mobile, and may be pivotably coupled to the frame 62 (e.g., coupled to an alignment rail 140). Rail alignment clamps 124 may be configured to grip the railway rail across the web of the railway rail and/or under the head of the railway rail.

Saw modules 100 may include a pair of rail spreading clamps 114 (also called spreading clamps) configured to grip the metal workpiece on opposite sides of the cutting path 144. Rail spreading clamps 114 may be configured to longitudinally translate the frame 62 and/or the saw 102 relative to the metal workpiece. The pair of rail spreading clamps 114 may be configured to apply tension to the metal workpiece (e.g., the railway rail) being, or to be, cut, across and/or substantially perpendicular to the cutting path 144. At least one of the rail alignment clamps 124 is located between the pair of spreading clamps 114, when present. For example, two rail alignment clamps 124 may be located on opposite sides of the cutting path 144, with both rail alignment clamps 124 between the pair of spreading clamps 114.

Each rail spreading clamp 114 includes a rail clamp 116, analogous to rail clamps 52, and a translating actuator 122. The translating actuator 122 may include, and/or may be, a hydraulic cylinder. The translating actuator 122 is configured to apply a force urging the frame 62 and/or the saw 102 to translate longitudinally along the metal workpiece (e.g., the railway rail). If the metal workpiece is only secured to the saw module 100 via one or more rail spreading clamps 114, the translating actuator(s) 122 may be operated (cooperatively) to reposition the frame 62 and/or the saw 102 above and/or along the metal workpiece. Tension may be applied to the metal workpiece by gripping the metal workpiece with the pair of rail spreading clamps 114 and then operating the translating actuators 122 to direct the rail spreading clamps 114 away from each other. Translating actuators 122 may be configured to apply spreading force of at least 50 ton-force (490 kN), at least 70 ton-force (690 kN), at least 90 ton-force (880 kN), at least 100 ton-force (980 kN), at least 120 ton-force (1200 kN), at least 150 ton-force (1500 kN), and/or at least 180 ton-force (1800 kN).

Railway rails, as installed, may be under significant stress, for example, due to differential thermal expansion/contraction of the railway and components. Often railway rails are installed pre-stressed (e.g., compressed) to mitigate some of the effects of daily and seasonally driven thermal expansion and contraction. Applying tension to a railway rail while cutting the railway rail may relieve deleterious stress in the railway rail, stress that might otherwise bind the saw blade 104 and/or damage the saw blade 104, saw 102, and/or saw module 100.

Rail clamps 116 of rail spreading clamps 114 may be configured to grip a railway rail and may be configured to grip the railway rail across the web and/or under the head. Rail clamps 116 include a rail clamp actuator 120 and at least two opposing rail clamp jaws 118. The rail clamp actuator 120 may include, and/or may be, a hydraulic cylinder. The rail clamp actuator 120 may be configured to apply up to 2 ton-force (20 kN), up to 5 ton-force (49 kN), up to 10 ton-force (98 kN), up to 20 ton-force (200 kN), up to 40 ton-force (390 kN), greater than 1 ton-force (9.8 kN), greater than 5 ton-force (49 kN), and/or greater than 40 ton-force (390 kN). At least one of the opposing rail clamp jaws 118 is mobile, and may be pivotably coupled to the rail spreading clamp 114.

Tool modules 60 and/or saw modules 100 may include a ballast plow mechanism 132 configured to remove and/or to displace ballast from under a railway rail along a clearing path 146 that is transverse to the railway rail. The clearing path 146 may be substantially perpendicular to the longitudinal direction of the railway rail. The clearing path 146 may substantially overlap and may be the same as the cutting path 144. The ballast plow mechanism 132 may be configured to create a clearance space in the ballast along the clearing path 146. The clearance space permits the saw 102 to cut the railway rail without contacting the ballast. If the saw 102 were to contact the ballast while cutting the railway rail, the ballast could damage the saw 102, the saw module 100, the tool module 60, and/or the railway rail. Moreover, the ballast could be launched a great distance and/or at great speed, presenting a potential hazard to nearby personnel and equipment. The clearance space may have depth below the railway rail of at most 200 mm, at most 100 mm, at most 50 mm, at least 10 mm, at least 20 mm, and/or at least 40 mm. The clearance space may have a width of at most 300 mm, at most 200 mm, at most 100 mm, at least 20 mm, at least 40 mm, and/or at least 60 mm.

The ballast plow mechanism 132 may include a ballast plow 136 and/or a ballast plow actuator 134. The ballast plow actuator 134 may include, and/or may be, a hydraulic cylinder. The ballast plow 136 may be configured to sweep and/or to swing under the railway rail transversely, generally arcing under the railway rail, transverse to the railway rail. The ballast plow mechanism 132 may be configured to drive the ballast plow 136 in an arc under the railway rail, transverse to the railway rail. The ballast plow 136 has a width, perpendicular to the clearing path 146 (and, hence, substantially longitudinal with respect to the railway rail), that generally is narrower than the spacing between adjacent sleepers of the railway. For example, the width of the ballast plow 136 may be at most 300 mm, at most 200 mm, at most 100 mm, at least 20 mm, at least 40 mm, and/or at least 60 mm. The ballast plow mechanism 132 and/or the ballast plow 136 may be configured to collect swarf (e.g., chips) from the railway rail as the railway rail is cut by the saw 102. Additionally or alternatively, saw modules 100 may include a chip collector 138 configured to collect swarf (e.g., chips) generated during cutting of the metal workpiece (e.g., railway rail).

Figure 12:
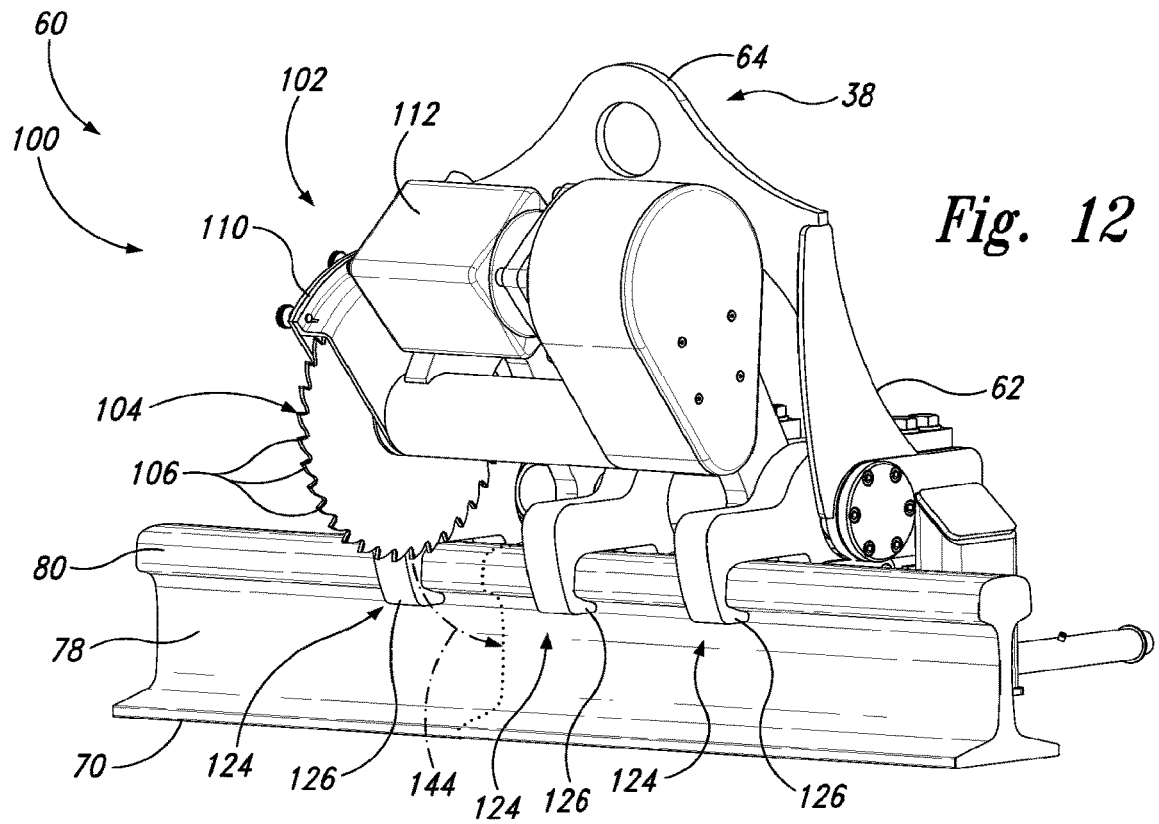
FIG. 12 is a front perspective of an example saw tool module poised to cut a railway rail.
Figure 13:
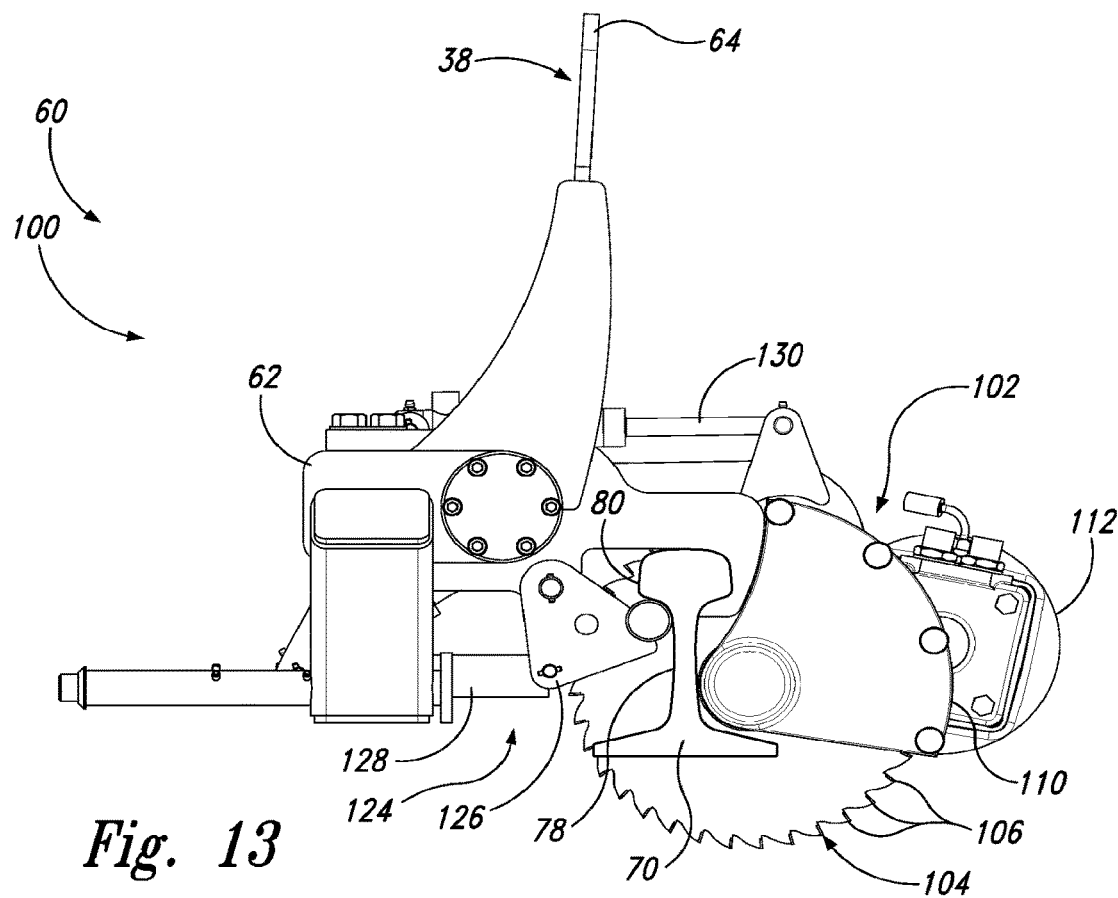
FIG. 13 is a side perspective of the saw tool module of FIG. 12 cutting the railway rail.

FIGS. 12 and 13 show an example of a saw module 100. The example saw module 100 includes a saw 102, a plurality of rail alignment clamps 124, a frame 62, and a blade motor 112. The rail alignment clamps 124 are arranged longitudinally along the railway rail 70, with one rail alignment clamp 124 on one side of the cutting path 144 and a pair of rail alignment clamps 124 on the opposite side of the cutting path 144. The frame 62 interconnects the saw 102 and the plurality or rail alignment clamps 124, and includes a module coupling element 38 that is a module coupling structure 64 (a ring). The saw 102 is configured to being cutting the railway rail 70 generally from above and the side of the head 80 of the railway rail 70. Moreover, the blade motor 112, as shown in FIGS. 12 and 13, is mounted to the saw 102 and moves with the saw 102 as the saw 102 cuts the railway rail 70 transversely along the cutting path 144. FIG. 12 illustrates the blade motor 112 in an up position with the saw 102 also in an up position over the railway rail 70 and FIG. 13 illustrates the blade 112 in a down position with the saw 102 also in a down position after having cut the railway rail 70.

Saw modules 100 are mobile, generally configured to be moved by a coupled articulated arm. Hence, saw modules 100 may be referred to as mobile saw modules. Saw modules 100 may be configured to be operated by one person (e.g., with the aid of the articulated arm and/or remote controls). Saw modules 100 may have a mass of less than 1500 kg, less than 1000 kg, less than 500 kg, less than 200 kg, or less than 100 kg.

Figure 14:
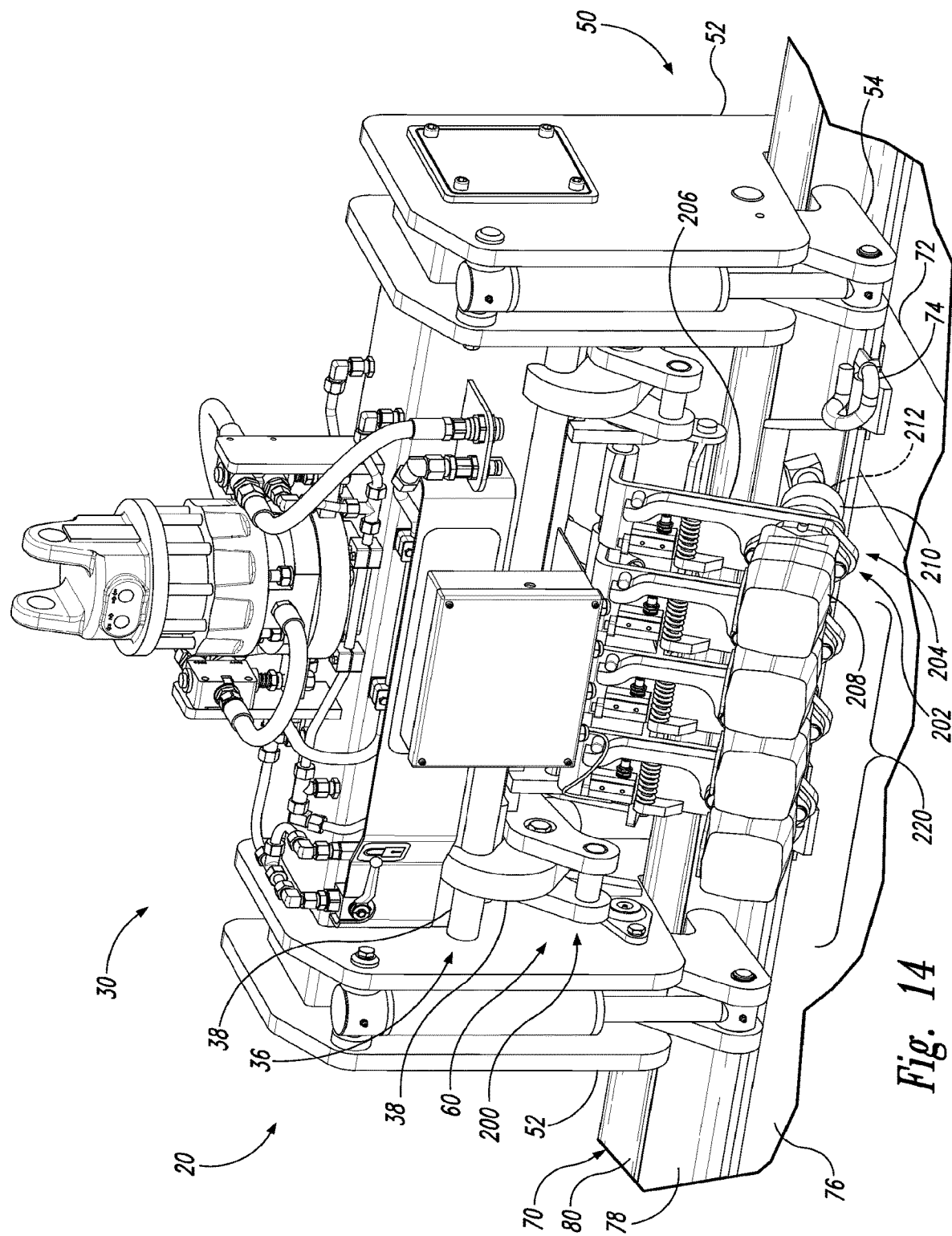
FIG. 14 is a perspective view of an example bolting-drilling tool module.

FIG. 14 shows an example tool attachment 20 with another type of tool module 60, namely, a rail bolting and/or drilling module 200 (also referred to as a bolting-drilling module, a bolting module, and/or a drilling module). Rail bolting and/or drilling modules 200 include a frame 62, a rail alignment clamp 124 and a module coupling element 38 of a module coupling 36 (e.g., a module clamp 40 and/or a module coupling structure 64).

Rail bolting and/or drilling modules 200 may be configured to operate rail bolts located within a longitudinal section 220 of the railway rail 70. Operating rail bolts may include tightening, loosening, inserting, and/or removing the rail bolts. Rail bolting and/or drilling modules 200 may include a plurality of bolt wrenches 202. Each bolt wrench 202 may be configured to operate (e.g., to tighten, to loosen, to insert, and/or to remove) a rail bolt. Each bolt wrench 202 may be an automatic wrench and may be a torque-limited wrench (also called a torque wrench). Each bolt wrench 202 may include a socket wrench head 210 and a motor 208 to drive the socket wrench head. The plurality of bolt wrenches 202 may be aligned in a row along the longitudinal section 220 of the railway rail 70 and the row may be configured to align longitudinally with the railway rail (and/or configured to longitudinally align with the railway rail when present). The bolt wrenches 202 may be configured to align with a pre-existing series, and/or a predetermined pattern, of rail bolts, and/or rail bolt holes, on the railway rail 70.

Further, rail bolting and/or drilling modules 200 may include a positioner 206 for the plurality of bolt wrenches 202. The positioner 206 is coupled between the frame 62 and the plurality of bolt wrenches 202. The positioner 206 is configured to move the plurality of bolt wrenches 202 between an active position and a clearance position. The positioner 206 may be configured to move one or more of the bolt wrenches 202 independent of the others and may be configured to move each of the bolt wrenches 202 independently. The active position is configured to align the respective bolt wrench(es) 202 over the corresponding rail bolt (and/or rail bolt hole) on the railway rail 70. The clearance position is configured to space the respective bolt wrench(es) 202 away from the railway rail 70 and/or the respective rail bolt (and/or rail bolt hole). The clearance position may be useful to position the rail bolting and/or drilling module 200 along the railway rail 70, to remove the rail bolting and/or drilling module 200 from the railway rail 70, and/or to engage the rail bolting and/or drilling module 200 with the railway rail 70.

Rail bolting and/or drilling modules 200 may be configured to form (e.g., to drill, to cut, and/or to punch) holes in the railway rail 70 within a longitudinal section 220 of the railway rail 70. Rail bolting and/or drilling modules 200 may include a plurality of drills 204. Each drill 204 may be configured to form a hole for a rail bolt, typically through the web of the railway rail 70. Each drill 204 may include a drill bit 212 (schematically indicated by a dotted lead line) and a motor 208 to drive the drill bit 212. The drills 204 may be aligned in a row along the longitudinal section 220 of the railway rail 70. The row may be configured to align longitudinally with the railway rail 70 (and/or configured to longitudinally align with the railway rail when present). The drills 204 may be configured to align with a predetermined series and/or pattern of holes site (i.e., sites where holes are to be formed on the railway rail 70). For example, the pattern of hole sites may be a series of spaced apart sites on the web 78. Thus, the plurality of drills 204 may be configured to form a series of spaced apart holes through the web 78 of the railway rail 70.

Further, rail bolting and/or drilling modules 200 may include a positioner 206 for the plurality of drills 204. The positioner 206 is coupled between the frame and the plurality of drills 204. The positioner 206 is configured to move the plurality of drills 204 between an active position and a clearance position. The positioner 206 may be configured to move one or more of the drills 204 independent of the others and may be configured to move each of the drills 204 independently. The active position is configured to align the respective drill(s) 204 and/or the corresponding drill bit(s) 212 to the respective hole site on the railway rail 70. The active position is configured to align the drill bit(s) 212 substantially perpendicular to the web 78 of the railway rail 70. The clearance position is configured to space the respective drill(s) 204 away from the railway rail 70 and/or the respective hole site (and/or hole). The clearance position may be useful to position the rail bolting and/or drilling module 200 along the railway rail 70, to remove the rail bolting and/or drilling module 200 from the railway rail 70, and/or to engage the rail bolting and/or drilling module 200 with the railway rail 70. The positioner 206 may be configured to linearly translate the plurality of drills 204 toward and away from the web 78 of the railway rail 70 to cut the holes through the web 78 of the railway rail 70. The positioner 206 may be configured to linearly translate one or more of the drills 204 independent of the other and may be configured to linearly translate each of the drills 204 independently.

Rail bolting and/or drilling modules 200 may be coupled to a tool adapter 30 and/or may be part of a tool attachment 20. The tool attachment 20 and/or the tool adapter 30 may include a rail handler 50 with two or more rail clamps 52 to grip the railway rail 70 and/or to align the bolt wrenches 202 and/or drills 204 with the railway rail 70 and/or the web 78 of the railway rail. Additionally or alternatively, rail bolting and/or drilling modules 200 may include one or more rail alignment clamps (not shown in FIG. 14, but referenced as number 124 in other figures). The rail alignment clamps may be configured to grip the railway rail 70 and/or to align the bolt wrenches 202 and/or drills 204 with the railway rail 70 and/or the web 78 of the railway rail. The rail alignment clamps may be configured to be spaced longitudinally from the longitudinal section 220, and may include at least one rail alignment clamp on each side of the longitudinal section 220 (as shown for the rail clamps 52). The rail alignment clamps may be arranged with respect to the longitudinal section 220 in the same manner as described with respect to the cutting path (e.g., with respect to FIGS. 9-11).

Figure 15:
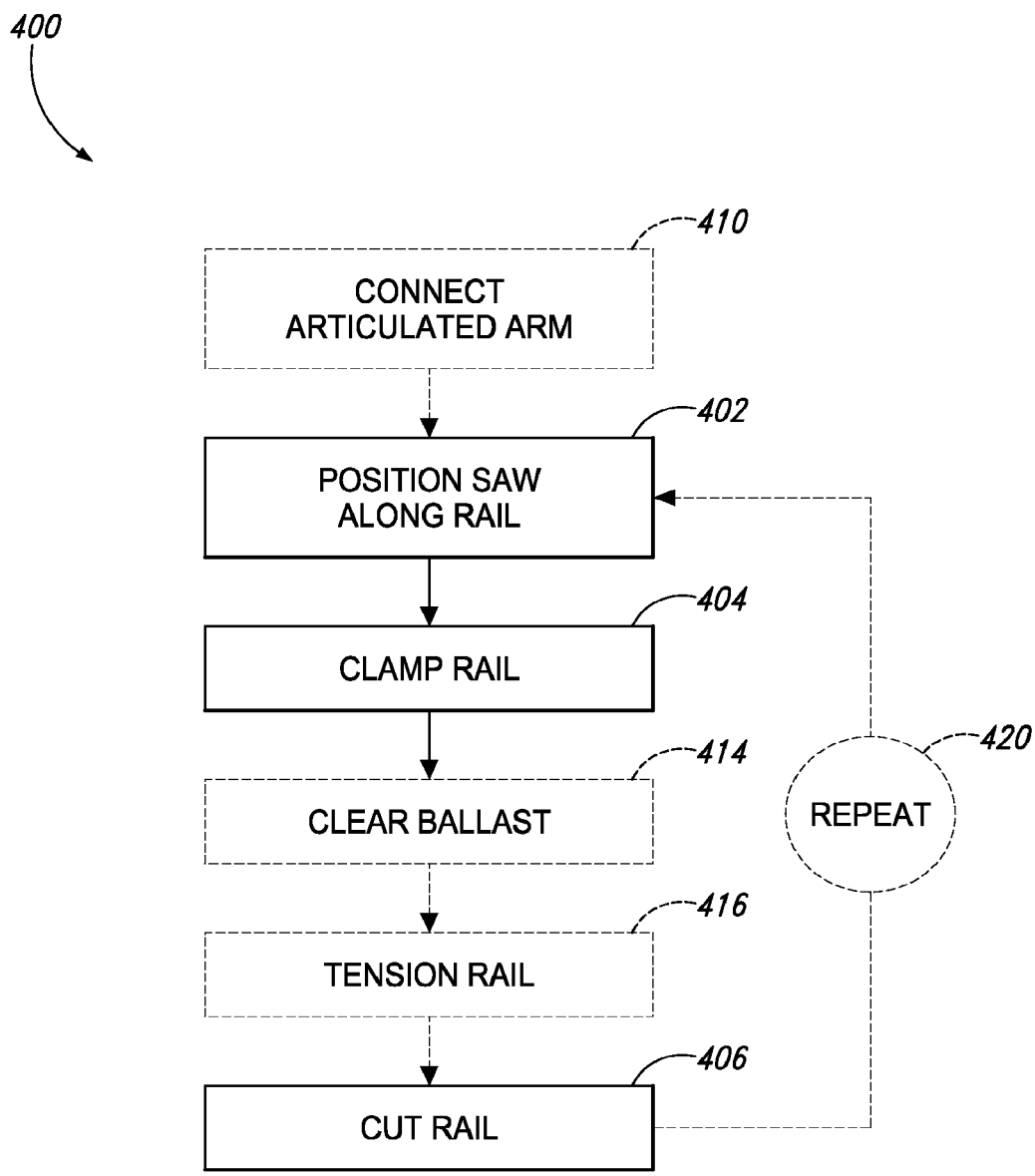
FIG. 15 is a schematic representation of methods of cutting a railway rail.

FIG. 15 schematically represents an example of using a cold saw module (such as saw module 100 that includes a cold saw). As indicated in FIG. 15, methods 400 of cutting a railway rail include positioning 402 a cold saw module at a cutting site along a railway rail installed in a railway, clamping 404 the cold saw module to the railway rail, and cutting 406 the railway rail with the cold saw module while the cold saw module is clamped to the railway rail.

Positioning 402 may include positioning with a translating actuator of the cold saw module (e.g., the translating actuator 122 of the spreading clamp 114). Positioning 402 may include positioning the cold saw module with an articulated arm (such as the articulated arm 14) connected to the cold saw module. Methods 400 may include connecting 410 the cold saw module to an articulated arm (such as the articulated arm 14). Connecting 410 may include connecting the articulated arm to a tool adapter (such as tool adapter 30) and connecting the tool adapter to the cold saw module.

Clamping 404 may include clamping the railway rail with one or more rail alignment clamps of the cold saw module (such as rail alignment clamps 124). Clamping 404 may include aligning the cold saw module such that a cold saw and/or a cold saw blade (e.g., saw 102 and/or saw blade 104) of the cold saw module is substantially perpendicular (e.g., essentially perpendicular) to the railway rail. Clamping 404 may include clamping at a clamping site within 100 mm, 200 mm, 300 mm, or 500 mm of the cutting site. Clamping 404 may include clamping the railway rail on opposite sides of the cutting site. Clamping 404 may include applying up to 2 ton-force (20 kN), up to 5 ton-force (49 kN), up to 10 ton-force (98 kN), up to 20 ton-force (200 kN), up to 40 ton-force (390 kN), greater than 1 ton-force (9.8 kN), greater than 5 ton-force (49 kN), and/or greater than 40 ton-force (390 kN) across the railway rail and/or across a web of the railway rail.

Cutting 406 may include cutting transversely through the railway rail, e.g., substantially perpendicular (e.g., essentially perpendicular) to the railway rail. Cutting 406 may include cutting along a cutting path through the railway rail. Cutting 406 may include cutting with a cold saw blade rotating at a speed of less than 500 RPM, less than 200 RPM, less than 100 RPM, less than 80 RPM, less than 50 RPM, less than 30 RPM, greater than 10 RPM, greater than 20 RPM, greater than 30 RPM, greater than 50 RPM, and/or greater than 80 RPM. Cutting 406 may include cutting with a cold saw blade operating at a speed of at least 30 SMPM, at least 50 SMPM, at least 80 SMPM, at least 100 SMPM, at least 150 SMPM, at most 300 SMPM, at most 200 SMPM, at most 150 SMPM, at most 100 SMPM, at most 80 SMPM, and/or at most 50 SMPM. Cutting 406 may include cutting with a cold saw blade with a diameter of at least 200 mm, at least 300 mm, at least 500 mm, at least 700 mm, at most 1000 mm, at most 800 mm, at most 600 mm, and/or at most 400 mm.

Methods 400 may include clearing 414 ballast from a clearance space under the railway rail, prior to the cutting 406. Clearing 414 may include clearing ballast with a ballast plow mechanism (such as ballast plow mechanism 132), for example, by driving a ballast plow (such as ballast plow 136) under the railway rail along a clearing path. The ballast plow mechanism may be a component of the cold saw module or may be an independent tool. The clearing space may be under the cutting site and may include ballast near the cutting site. For example, the clearance space may have a depth under the railway rail of at most 200 mm, at most 100 mm, at most 50 mm, at least 10 mm, at least 20 mm, and/or at least 40 mm. The clearance space may have a width of at most 300 mm, at most 200 mm, at most 100 mm, at least 20 mm, at least 40 mm, and/or at least 60 mm.

Methods 400 may include, prior to the cutting 406, tensioning 416 the railway rail about the cutting site (i.e., tension is applied across the cutting site along the longitudinal direction of the railway rail). Tensioning 416 may relieve stress and/or compression in the railway rail and may avoid binding and/or damage of the cold saw as the railway rail is cut. Tension may be applied by a spreading clamp, e.g., the spreading clamp 114. Tensioning 416 may include applying spreading force of at least 50 ton-force (490 kN), at least 70 ton-force (690 kN), at least 90 ton-force (880 kN), at least 100 ton-force (980 kN), at least 120 ton-force (1200 kN), at least 150 ton-force (1500 kN), and/or at least 180 ton-force (1800 kN) across the cutting site.

Methods 400 may include repeating 420 at least the positioning 402 and the cutting 406 at a second cutting site to cut the railway rail at the second cutting site (hence, the original cutting site may be referred to as the first cutting site). Repeating 420 may include repeating all of the steps of methods 400 at the second cutting site, for example, repeating the clamping 404, the clearing 414, and/or the tensioning 416. Methods 400 may include removing and/or replacing a section of railway rail between the first cutting site and the second cutting site (after cutting both sites).

Examples of inventive subject matter according to the present disclosure are described in the following enumerated paragraphs.

A1. A railway maintenance system comprising:
an optional power source;
an optional vehicle;
an optional articulated arm;
an optional end coupling; and
a tool attachment that includes a tool module and that optionally includes a tool adapter.

A2. The system of paragraph A1, wherein the tool module is the saw module of any of paragraphs B1-B29.4.

A3. The system of any of paragraphs A1-A2, wherein the tool module is the tool module of any of paragraphs C1-C10.2.

A4. The system of any of paragraphs A1-A3, wherein the tool module is at least one of a rail saw, a sparkless rail saw, a rail handler, a spike driver, a spike puller, a sleeper tamper, a sleeper exchanger, a clipping tool, a clip installer, a clip remover, a rail bolter, a rail drill, a sleeper drill, a weld alignment tool, a thermite weld installer, a rail mill, a switch mill, a ballast plow, and a ballast broom.

A5. The system of any of paragraphs A1-A4, wherein the tool attachment includes a module coupling element and optionally wherein the module coupling element is a portion of a module coupling.

A5.1. The system of paragraph A5, wherein the module coupling and/or the module coupling element is configured to selectively couple the tool module to an articulated arm and/or a tool adapter.

A5.2. The system of any of paragraphs A5-A5.1, wherein the module coupling and/or the module coupling element couples the tool module to an articulated arm and/or a tool adapter.

A5.3. The system of any of paragraphs A5-A5.2, wherein the module coupling includes a module clamp and a module coupling structure, and optionally wherein the module coupling element includes at least a portion of the module clamp and/or the module coupling structure.

A5.3.1. The system of paragraph A5.3, wherein the module clamp includes a module clamp actuator and at least two opposing module clamp jaws.

A5.3.1.1. The system of paragraph A5.3.1, wherein the module clamp actuator includes, optionally is, a hydraulic cylinder.

A5.3.1.2. The system of any of paragraphs A5.3.1-A5.3.1.1, wherein at least one module clamp jaw is pivotably coupled to the tool module or the optional tool adapter.

A5.3.2. The system of any of paragraphs A5.3-A5.3.1.2, wherein the module clamp is configured to grip the module coupling structure.

A5.3.3. The system of any of paragraphs A5.3-A5.3.2, wherein the module coupling structure is configured to be gripped by the module clamp.

A5.3.4. The system of any of paragraphs A5.3-A5.3.3, wherein the module coupling includes a module lock that is configured to lock the module clamp in an open position and/or a closed position.

A6. The system of any of paragraphs A1-A5.3.4, wherein the tool module includes a frame.

A6.1. The system of paragraph A6, wherein the frame is coupled to, and/or is configured to support, at least one of a module coupling element, a module clamp, a module coupling structure, a module clamp actuator, and a module clamp jaw.

A7. The system of any of paragraphs A1-A6.1, wherein the tool adapter includes an arm coupling mechanism configured to couple to an end of an articulated arm.

A7.1. The system of paragraph A7, wherein the arm coupling mechanism includes, optionally is, at least one of a hitch, universal coupling mechanism, a yoke, a socket, a receiver, a pin, a clevis, a shackle, a plug, a knuckle, and a clamp.

A7.2. The system of any of paragraphs A7-A7.1, wherein the arm coupling mechanism is configured to mate to an attachment coupling mechanism to form an end coupling.

A7.3. The system of any of paragraphs A7-A7.2, wherein the arm coupling mechanism is configured to automatically and/or manually couple to/from the end of the articulated arm.

A8. The system of any of paragraphs A1-A7.3, wherein the tool adapter includes a rotator.

A8.1. The system of paragraph A8, wherein the rotator is configured to rotate a frame of the tool adapter relative to an arm coupling mechanism of the tool adapter.

A8.2. The system of any of paragraphs A8-A8.1, wherein the rotator is a powered rotator, optionally a hydraulically-powered rotator.

A9. The system of any of paragraphs A1-A8.2, wherein the tool adapter includes a frame.

A9.1. The system of paragraph A9, wherein the frame is coupled to, and/or is configured to support, at least one of an arm coupling mechanism of the tool adapter, a rotator of the tool adapter, a module coupling element of the tool adapter, and a rail handler of the tool adapter.

A10. The system of any of paragraphs A1-A9.1, wherein the tool adapter includes an input power connector.

A10.1. The system of paragraph A10, wherein the input power connector is configured to supply and/or direct power to the tool adapter.

A11. The system of any of paragraphs A1-A10.1, wherein the tool adapter includes a module power connector.

A11.1. The system of paragraph A11, wherein the module power connector is configured to supply and/or direct power to a tool module.

A12. The system of any of paragraphs A1-A11.1, wherein the tool adapter includes a module coupling element.

A12.1. The system of paragraph A12, wherein the module coupling element includes a module clamp and optionally wherein the module clamp is configured to grip a module coupling structure.

A12.2. The system of any of paragraphs A12-A12.1, wherein the module coupling element includes a module coupling structure and optionally wherein the module coupling structure is configured to be gripped by a module clamp.

A13. The system of any of paragraphs A1-A12.2, wherein the tool adapter includes a rail handler that includes at least one rail clamp.

A13.1. The system of paragraph A13, wherein the rail clamp is configured to grip a railway rail, and optionally configured to grip the railway rail across a web of the railway rail and/or under a head of the railway rail.

A13.2. The system of any of paragraphs A13-A13.1, wherein the rail handler includes two spaced apart rail clamps.

A13.3. The system of any of paragraphs A13-A13.2, wherein each rail clamp includes a rail clamp actuator and at least two opposing rail clamp jaws.

A13.3.1. The system of paragraph A13.3, wherein the rail clamp actuator includes, optionally is, a hydraulic cylinder.

A13.3.2. The system of any of paragraphs A13.3-A13.3.1, wherein at least one rail clamp jaw is pivotably coupled to a frame of the tool adapter.

A14. The system of any of paragraphs A1-A13.3.2, wherein the tool adapter is configured to be supported by a railway and optionally is configured to roll on a railway.

A15. The system of any of paragraphs A1-A14, wherein the tool adapter includes wheels configured to support at least one of the tool attachment, the tool adapter, and the tool module, and optionally wherein the wheels are configured to fit a railway.

A16. The system of any of paragraphs A1-A15, wherein the power source includes, optionally is, a hydraulic power source.

A17. The system of any of paragraphs A1-A16, wherein the power source includes a hydraulic pump.

A18. The system of any of paragraphs A1-A17, wherein the vehicle is configured to travel on a railway and off a railway.

A19. The system of any of paragraphs A1-A18, wherein the vehicle is a truck and/or an excavator.

A20. The system of any of paragraphs A1-A19, wherein the vehicle includes a power source, optionally a hydraulic power source.

A21. The system of any of paragraphs A1-A20, wherein the articulated arm is coupled to a vehicle.

A22. The system of any of paragraphs A1-A21, wherein the articulated arm is configured to be powered by a power source, optionally by a hydraulic power source.

A23. The system of any of paragraphs A1-A22, wherein the articulated arm is a powered articulated arm, optionally a hydraulically-powered articulated arm.

A24. The system of any of paragraphs A1-A23, wherein the articulated arm is a work group of an excavator and/or a crane.

A25. The system of any of paragraphs A1-A24, wherein the articulated arm has a base, optionally wherein the base is connected to a vehicle.

A26. The system of any of paragraphs A1-A25, wherein the articulated arm has an end.

A26.1. The system of paragraph A26, wherein the end is connected to a tool adapter.

A26.2. The system of any of paragraphs A26-A26.1, wherein the end includes an attachment coupling mechanism, optionally wherein the attachment coupling mechanism is configured to mate to an arm coupling mechanism to form an end coupling.

A27. The system of any of paragraphs A1-A26.2, wherein the end coupling couples the articulated arm to the tool adapter and/or a tool module.

A28. The system of any of paragraphs A1-A27, wherein the end coupling includes an attachment coupling mechanism and an arm coupling mechanism.

A29. The system of any of paragraphs A1-A28, wherein the end coupling includes, optionally is, at least one of a hitch, universal coupling mechanism, a yoke, a socket, a receiver, a pin, a clevis, a shackle, a plug, a knuckle, and a clamp.

A30. The use of the system of any of paragraphs A1-A29 to maintain a railway, to repair a railway, and/or to replace a section of a railway.

B1. A saw module comprising:

a frame optionally configured to longitudinally span a length of a railway rail;

a saw with a cutting path configured to cut a/the railway rail transversely, wherein the saw is coupled to the frame;

an optional pair of spreading clamps with a first spreading clamp of the pair configured to grip the railway rail on one side of the cutting path, and a second spreading clamp of the pair configured to grip the railway rail on an opposite side of the cutting path, wherein the pair of spreading clamps are coupled to the frame;

at least one rail alignment clamp configured to grip the railway rail near the cutting path, wherein the at least one rail alignment clamp is coupled to the frame;

an optional feed actuator configured to drive the saw along the cutting path, wherein the feed actuator is coupled to the frame;

an optional ballast plow mechanism configured to remove and/or to displace ballast from under the railway rail along the cutting path, wherein the ballast plow mechanism is coupled to the frame; and an optional module coupling element configured to selectively couple to a mating module coupling element of at least one of an articulated arm and a tool adapter, wherein the module coupling element is coupled to the frame.

B2. The saw module of paragraph B1, wherein the saw is at least one of a cold saw and a sparkless saw.

B3. The saw module of any of paragraphs B1-B2, wherein the saw is an abrasive saw.

B4. The saw module of any of paragraphs B1-B3, wherein the saw includes a saw blade.

B4.1. The saw module of paragraph B4, wherein the saw blade is at least one of a circular saw blade, a cold saw blade, a carbide-tipped saw blade, a cermet-tipped saw blade, and an abrasive saw blade.

B4.2. The saw module of any of paragraphs B4-B4.1, wherein the saw blade is composed substantially of at least one of steel, high speed steel, hardened steel, tungsten carbide, a carbide, and ceramic.

B4.3. The saw module of any of paragraphs B4-B4.2, wherein the saw blade includes a plurality of teeth.

B4.3.1. The saw module of paragraph B4.3, wherein the teeth are composed substantially of at least one of steel, high speed steel, hardened steel, tungsten carbide, a carbide, cermet, cermeted carbide, and cobalt.

B4.3.2. The saw module of any of paragraphs B4.3-B4.3.1, wherein the teeth include at least one of a wear-resistant coating and a dry lubricant coating.

B4.3.3. The saw module of any of paragraphs B4.3-B4.3.2, wherein the teeth include a coating including at least one of a nitride, titanium nitride, titanium carbon nitride, titanium aluminum nitride, and titanium aluminum carbon nitride.

B4.4. The saw module of any of paragraphs B4-B4.3.3, wherein the saw blade has a diameter of at least 200 mm, at least 300 mm, at least 500 mm, at least 700 mm, at most 1000 mm, at most 800 mm, at most 600 mm, and/or at most 400 mm.

B5. The saw module of any of paragraphs B1-B4.4, wherein the saw includes a blade motor.

B5.1. The saw module of paragraph B5, wherein the blade motor is a hydraulic motor.

B5.2. The saw module of any of paragraphs B5-B5.1, wherein the blade motor is a low speed, high torque motor.

B6. The saw module of any of paragraphs B1-B5.2, wherein the saw is configured to rotate a saw blade at a speed of less than 500 RPM, less than 200 RPM, less than 100 RPM, less than 80 RPM, less than 50 RPM, less than 30 RPM, greater than 10 RPM, greater than 20 RPM, greater than 30 RPM, greater than 50 RPM, and/or greater than 80 RPM.

B7. The saw module of any of paragraphs B1-B6, wherein the saw is configured to rotate a saw blade at a speed of at least 30 SMPM, at least 50 SMPM, at least 80 SMPM, at least 100 SMPM, at least 150 SMPM, at most 300 SMPM, at most 200 SMPM, at most 150 SMPM, at most 100 SMPM, at most 80 SMPM, and/or at most 50 SMPM.

B8. The saw module of any of paragraphs B1-B7, wherein the saw includes a pair of blade truing rollers.

B9. The saw module of any of paragraphs B1-B8, wherein the saw includes a saw guard.

B10. The saw module of any of paragraphs B1-B9, wherein the frame includes one or more alignment rails.

B10.1. The saw module of paragraph B10, wherein the frame includes two or more alignment rails and optionally wherein at least two alignment rails are substantially parallel and spaced apart.

B10.2. The saw module of any of paragraphs B10-B10.1, wherein at least one, optionally each, alignment rail is arranged longitudinally.

B10.3. The saw module of any of paragraphs B10-B10.2, wherein at least one, optionally each, alignment rail is arranged substantially perpendicular to the cutting path.

B10.4. The saw module of any of paragraphs B10-B10.3, wherein at least one, optionally each, alignment rail is configured to align parallel to the railway rail.

B11. The saw module of any of paragraphs B1-B10.4, wherein each spreading clamp includes a rail clamp configured to grip the railway rail, and optionally configured to grip the railway rail across a web of the railway rail and/or under a head of the railway rail.

B11.1. The saw module of paragraph B11, wherein the rail clamp includes a rail clamp actuator and at least two opposing rail clamp jaws.

B11.1.1. The saw module of paragraph B11.1, wherein the rail clamp actuator includes, optionally is, a hydraulic cylinder.

B11.1.2. The saw module of any of paragraphs B11.1-B11.1.1, wherein at least one, optionally each, rail clamp jaw is pivotably coupled to the frame, optionally to at least one alignment rail of the frame.

B12. The saw module of any of paragraphs B1-B11.1.2, wherein each spreading clamp includes a translating actuator configured to translate the spreading clamp along at least one alignment rail of the frame, and optionally wherein the translating actuator includes, optionally is, a hydraulic cylinder.

B13. The saw module of any of paragraphs B1-B12, wherein the pair of spreading clamps are configured to grip a railway rail at two positions along the railway rail and to apply tension to the railway rail between the two positions, and optionally wherein the two positions are on opposite sides of the cutting path.

B14. The saw module of any of paragraphs B1-B13, wherein at least one, optionally each, rail alignment clamp is configured to grip the railway rail between the pair of spreading clamps.

B15. The saw module of any of paragraphs B1-B14, wherein at least one, optionally each, rail alignment clamp is configured to grip the railway rail across a web of the railway rail and/or under a head of the railway rail.

B16. The saw module of any of paragraphs B1-B15, wherein the at least one rail alignment clamp includes a first rail alignment clamp on one side of the cutting path and a second rail alignment clamp on an opposite side of the cutting path.

B16.1. The saw module of paragraph B16, wherein each of the first rail alignment clamp and the second rail alignment clamp are within 100 mm, 200 mm, 300 mm, or 500 mm of the cutting path.

B17. The saw module of any of paragraphs B1-B16.1, wherein the at least one rail alignment clamp includes at least two rail alignment clamps configured to grip the railway rail at longitudinally spaced apart points along the railway rail.

B17.1. The saw module of paragraph B17, wherein the at least two rail alignment clamps are configured to grip the railway rail on opposite sides of the cutting path.

B17.2. The saw module of any of paragraphs B17-B17.1, wherein at least two of the rail alignment clamps are within 100 mm, 200 mm, 300 mm, or 500 mm of the cutting path.

B18. The saw module of any of paragraphs B1-B17.2, wherein the at least one rail alignment clamp is configured to align the cutting path substantially perpendicular to the railway rail while the at least one rail alignment clamp grips the railway rail.

B19. The saw module of any of paragraphs B1-B18, wherein each rail alignment clamp is longitudinally spaced apart from the cutting path.

B20. The saw module of any of paragraphs B1-B19, wherein at least one rail alignment clamp is configured to grip the railway rail within 100 mm, 200 mm, 300 mm, or 500 mm of the cutting path.

B21. The saw module of any of paragraphs B1-B20, wherein each rail alignment clamp includes a rail alignment clamp actuator and at least two opposing rail alignment clamp jaws.

B21.1. The saw module of paragraph B21, wherein the rail alignment clamp actuator includes, optionally is, a hydraulic cylinder.

B21.2. The saw module of any of paragraphs B21-B21.1, wherein at least one, optionally each, rail alignment clamp jaw is pivotably coupled to the frame, optionally to at least one alignment rail of the frame.

B22. The saw module of any of paragraphs B1-B21.2, wherein the feed actuator includes, optionally is, a hydraulic cylinder.

B23. The saw module of any of paragraphs B1-B22, wherein the feed actuator is configured to move the saw while the saw is cutting the railway rail.

B24. The saw module of any of paragraphs B1-B23, wherein the feed actuator is configured to move a/the saw blade of the saw at a substantially constant velocity along the cutting path.

B25. The saw module of any of paragraphs B1-B24, wherein the ballast plow mechanism includes a ballast plow and/or a ballast plow actuator.

B25.1. The saw module of paragraph B25, wherein the ballast plow is configured to sweep and/or to swing under the railway rail transversely.

B25.2. The saw module of any of paragraphs B25-B25.1, wherein the ballast plow mechanism is configured to drive the ballast plow in an arc under the railway rail, transverse to the railway rail.

B25.3. The saw module of any of paragraphs B25-B25.2, wherein the ballast plow has a width, perpendicular to the cutting path, that is at most 300 mm, at most 200 mm, at most 100 mm, at least 20 mm, at least 40 mm, and/or at least 60 mm.

B25.4. The saw module of any of paragraphs B25-B25.3, wherein the ballast plow is configured to collect swarf from the railway rail as the railway rail is cut by the saw.

B25.5. The saw module of any of paragraphs B25-B25.4, wherein the ballast plow actuator includes, optionally is, a hydraulic cylinder.

B26. The saw module of any of paragraphs B1-B25.5, wherein the module coupling element includes at least one of a module clamp and a module coupling structure.

B26.1. The saw module of paragraph B26, wherein the module clamp includes a module clamp actuator and optionally wherein the module clamp actuator includes, optionally is, a hydraulic cylinder.

B26.2. The saw module of any of paragraphs B26-B26.1, wherein the module clamp includes at least two opposing module clamp jaws and optionally wherein at least one module clamp jaw is pivotably coupled to the frame.

B26.3. The saw module of any of paragraphs B26-B26.2, wherein the module clamp is configured to grip a mating module coupling structure.

B26.4. The saw module of any of paragraphs B26-B26.3, wherein the module coupling structure is configured to be gripped by a mating module clamp.

B26.5. The saw module of any of paragraphs B26-B26.4, wherein the module clamp and/or the module coupling structure includes a module lock that is configured to lock the module clamp in at least one of an open position and a closed position.

B27. The saw module of any of paragraphs B1-B26.5, wherein the saw module is configured to be supported by a railway and optionally is configured to roll on a railway.

B28. The saw module of any of paragraphs B1-B27, further comprising feet structures configured to support the saw module.

B28.1. The saw module of paragraph B28, wherein the feet structures are configured to fit at least one of a railway and the railway rail.

B28.2. The saw module of any of paragraphs B28-B28.1, wherein the feet structures include, optional are, wheels.

B29. The saw module of any of paragraphs B1-B28.2, wherein the saw module is a mobile saw module, wherein the mobile saw module includes a cold saw, and wherein the railway rail, where used, is a metal workpiece.

B29.1. The mobile saw module of paragraph B29, wherein the mobile saw module is configured to be operated by a single person.

B29.2. The mobile saw module of any of paragraphs B29-B29.1, wherein the mobile saw module has a mass of less than 1500 kg, less than 1000 kg, less than 500 kg, less than 200 kg, or less than 100 kg.

B29.3. The mobile saw module of any of paragraphs B29-B29.2, wherein the mobile saw module is configured to grab the metal workpiece on opposite sides of the cutting path.

B29.4. The mobile saw module of any of paragraphs B29-B29.3, wherein the metal workpiece is an elongated metal workpiece and optionally wherein the metal workpiece is at least one of a beam, a rail, a rod, a plate, a tube, a pipe, and conduit.

B30. The use of the saw module of any of paragraphs B1-B29.4 to cut the railway rail, optionally the railway rail as installed in a railway.

B31. The use of the saw module of any of paragraphs B1-B29.4 to cut out a section of the railway rail from a railway.

B32. The use of the mobile saw module of any of paragraphs B29-B29.4 to cut through the metal workpiece at a field site, optionally wherein the metal workpiece is installed at the field site.

C1. A tool module comprising:
a frame configured to longitudinally span a length of a railway rail; and at least one rail alignment clamp configured to grip the railway rail, wherein the at least one rail alignment clamp is coupled to the frame;
a module coupling element configured to selectively couple to a mating module coupling element of at least one of an articulated arm and a tool adapter, wherein the module coupling element is coupled to the frame.

C2. The tool module of paragraph C1, further comprising a ballast plow mechanism configured to remove and/or to displace ballast from under the railway rail along a clearing path transverse to the railway rail, wherein the ballast plow mechanism is coupled to the frame, and optionally wherein the tool module is a ballast plow module.

C2.1. The tool module of paragraph C2, wherein the ballast plow mechanism includes a ballast plow and/or a ballast plow actuator.

C2.1.1. The tool module of paragraph C2.1, wherein the ballast plow is configured to sweep and/or to swing under the railway rail transversely.

C2.1.2. The tool module of any of paragraphs C2.1-C2.1.1, wherein the ballast plow mechanism is configured to drive the ballast plow in an arc under the railway rail, transverse to the railway rail.

C2.1.3. The tool module of any of paragraphs C2.1-C2.1.2, wherein the ballast plow has a width, perpendicular to the clearing path, that is at most 300 mm, at most 200 mm, at most 100 mm, at least 20 mm, at least 40 mm, and/or at least 60 mm.

C2.1.4. The tool module of any of paragraphs C2.1-C2.1.3, wherein the ballast plow actuator includes, optionally is, a hydraulic cylinder.

C2.2. The tool module of any of paragraphs C2-C2.1.4, wherein the at least one rail alignment clamp includes a first rail alignment clamp on one side of the clearing path and a second rail alignment clamp on an opposite side of the clearing path.

C2.2.1. The tool module of paragraph C2.2, wherein each of the first rail alignment clamp and the second rail alignment clamp are within 100 mm, 200 mm, 300 mm, or 500 mm of the clearing path.

C2.3. The tool module of any of paragraphs C2-C2.2.1, wherein the at least one rail alignment clamp includes at least two rail alignment clamps configured to grip the railway rail at longitudinally spaced apart points along the railway rail.

C2.3.1. The tool module of paragraph C2.3, wherein the at least two rail alignment clamps are configured to grip the railway rail on opposite sides of the clearing path.

C2.3.2. The tool module of any of paragraphs C2.3-C2.3.1, wherein at least two of the rail alignment clamps are within 100 mm, 200 mm, 300 mm, or 500 mm of the clearing path.

C2.4. The tool module of any of paragraphs C2-C2.3.2, wherein the at least one rail alignment clamp is configured to align the clearing path substantially perpendicular to the railway rail while the at least one rail alignment clamp grips the railway rail.

C2.5. The tool module of any of paragraphs C2-C2.4, wherein each rail alignment clamp is longitudinally spaced apart from the clearing path.

C2.6. The tool module of any of paragraphs C2-C2.5, wherein at least one rail alignment clamp is configured to grip the railway rail within 100 mm, 200 mm, 300 mm, or 500 mm of the clearing path.

C3. The tool module of any of paragraphs C1-02.6, further comprising a plurality of bolt wrenches configured to operate rail bolts located within a longitudinal section of the railway rail, optionally wherein each of the plurality of bolt wrenches is configured to at least one of tighten, loosen, insert, and remove the respective rail bolt, and optionally wherein the tool module is a rail bolting module.

C3.1. The tool module of paragraph C3, wherein each bolt wrench is an automatic wrench.

C3.2. The tool module of any of paragraphs C3-C3.1, wherein each bolt wrench is a torque-limited wrench.

C3.3. The tool module of any of paragraphs C3-C3.2, wherein each bolt wrench includes a motor configured to drive a socket wrench head.

C3.4. The tool module of any of paragraphs C3-C3.3, wherein each bolt wrench includes a socket wrench head.

C3.5. The tool module of any of paragraphs C3-C3.4, wherein the plurality of bolt wrenches are aligned in a row along the longitudinal section of the railway rail, wherein the row is configured to align longitudinally with the railway rail.

C3.6. The tool module of any of paragraphs C3-C3.5, wherein the bolt wrenches are configured to align with a series of rail bolts on the railway rail.

C3.7. The tool module of any of paragraphs C3-C3.6, further comprising a positioner for the plurality of bolt wrenches, where the positioner is coupled between the frame and the plurality of bolt wrenches.

C3.7.1. The tool module of paragraph C3.7, wherein the positioner is configured to move the plurality of bolt wrenches, optionally each independently, between an active position and a clearance position, and optionally wherein the active position is configured to align the respective bolt wrench over a rail bolt on the railway rail, and optionally wherein the clearance position is configured to space the respective bolt wrench away from the railway rail and/or the respective rail bolt.

C3.8. The tool module of any of paragraphs C3-C3.7.1, wherein the at least one rail alignment clamp includes a first rail alignment clamp on one side of the longitudinal section and a second rail alignment clamp on an opposite side of the longitudinal section.

C3.9. The tool module of any of paragraphs C3-C3.8, wherein each of the first rail alignment clamp and the second rail alignment clamp are each independently within 100 mm, 200 mm, 300 mm, or 500 mm of the longitudinal section.

C3.10. The tool module of any of paragraphs C3-C3.9, wherein the at least one rail alignment clamp includes at least two rail alignment clamps configured to grip the railway rail at longitudinally spaced apart points along the railway rail.

C3.10.1. The tool module of paragraph C3.10, wherein the at least two rail alignment clamps are configured to grip the railway rail on opposite sides of the longitudinal section.

C3.10.2. The tool module of any of paragraphs C3.10-C3.10.1, wherein at least two of the rail alignment clamps are within 100 mm, 200 mm, 300 mm, or 500 mm of the longitudinal section.

C3.11. The tool module of any of paragraphs C3-C3.10.2, wherein each rail alignment clamp is longitudinally spaced apart from the longitudinal section.

C3.12. The tool module of any of paragraphs C3-C3.11, wherein at least one rail alignment clamp is configured to grip the railway rail within 100 mm, 200 mm, 300 mm, or 500 mm of the longitudinal section.

C4. The tool module of any of paragraphs C1-03.12, further comprising a plurality of drills configured to form holes in the railway rail within a longitudinal section of the railway rail, and optionally wherein the tool module is a rail drilling module.

C4.1. The tool module of paragraph C4, wherein each drill includes a motor configured to drive a drill bit.

C4.2. The tool module of any of paragraphs C4-C4.1, wherein each drill includes a drill bit.

C4.3. The tool module of any of paragraphs C4-C4.2, wherein the drills are aligned in a row along the longitudinal section of the railway rail, wherein the row is configured to align longitudinally with the railway rail.

C4.4. The tool module of any of paragraphs C4-C4.3, wherein the plurality of drills is configured to form a series of spaced apart holes through a web of the railway rail.

C4.5. The tool module of any of paragraphs C4-C4.4, further comprising a positioner for the plurality of drills, where the positioner is coupled between the frame and the plurality of drills.

C4.5.1. The tool module of paragraph C4.5, wherein the positioner is configured to move the plurality of drills, optionally each independently, between an active position and a clearance position, optionally wherein the active position is configured to align a/the drill bit in the respective drill substantially perpendicular to a web of the railway rail, and optionally wherein the clearance position is configured to space the respective drill away from the railway rail.

C4.5.2. The tool module of any of paragraphs C4.5-C4.5.1, wherein the positioner is configured to linearly translate the plurality of drills, optionally each independently, toward and away from a web of the railway rail to form a hole through the web.

C4.6. The tool module of any of paragraphs C4-C4.5.2, wherein the at least one rail alignment clamp includes a first rail alignment clamp on one side of the longitudinal section and a second rail alignment clamp on an opposite side of the longitudinal section.

C4.6.1. The tool module of paragraph C4.6, wherein each of the first rail alignment clamp and the second rail alignment clamp are each independently within 100 mm, 200 mm, 300 mm, or 500 mm of the longitudinal section.

C4.7. The tool module of any of paragraphs C4-C4.6.1, wherein the at least one rail alignment clamp includes at least two rail alignment clamps configured to grip the railway rail at longitudinally spaced apart points along the railway rail.

C4.7.1. The tool module of paragraph C4.7, wherein the at least two rail alignment clamps are configured to grip the railway rail on opposite sides of the longitudinal section.

C4.7.2. The tool module of any of paragraphs C4.7-C4.7.1, wherein at least two of the rail alignment clamps are within 100 mm, 200 mm, 300 mm, or 500 mm of the longitudinal section.

C4.8. The tool module of any of paragraphs C4-C4.7.2, wherein the at least one rail alignment clamp is configured to align a/the drill bit in each of the plurality of drills substantially perpendicular to the railway rail while the at least one rail alignment clamp grips the railway rail.

C4.9. The tool module of any of paragraphs C4-C4.8, wherein each rail alignment clamp is longitudinally spaced apart from the longitudinal section.

C4.10. The tool module of any of paragraphs C4-C4.9, wherein at least one rail alignment clamp is configured to grip the railway rail within 100 mm, 200 mm, 300 mm, or 500 mm of the longitudinal section.

C5. The tool module of any of paragraphs C1-04.10, wherein the frame includes one or more alignment rails.

C5.1. The tool module of paragraph C5, wherein the frame includes two or more alignment rails and optionally wherein at least two alignment rails are substantially parallel and spaced apart.

C5.2. The tool module of any of paragraphs C5-05.1, wherein at least one, optionally each, alignment rail is arranged longitudinally.

C5.3. The tool module of any of paragraphs C5-05.2, wherein at least one, optionally each, alignment rail is arranged substantially perpendicular to at least one of a/the cutting path and a/the clearing path.

C5.4. The tool module of any of paragraphs C5-05.3, wherein at least one, optionally each, alignment rail is configured to align parallel to the railway rail.

C6. The tool module of any of paragraphs C1-05.4, wherein the module coupling element includes at least one of a module clamp and a module coupling structure.

C6.1. The tool module of paragraph C6, wherein the module clamp includes a module clamp actuator and optionally wherein the module clamp actuator includes, optionally is, a hydraulic cylinder.

C6.2. The tool module of any of paragraphs C6-C6.1, wherein the module clamp includes at least two opposing module clamp jaws and optionally wherein at least one module clamp jaw is pivotably coupled to the frame.

C6.3. The tool module of any of paragraphs C6-C6.2, wherein the module clamp is configured to grip a mating module coupling structure.

C6.4. The tool module of any of paragraphs C6-C6.3, wherein the module coupling structure is configured to be gripped by a mating module clamp.

C6.5. The tool module of any of paragraphs C6-C6.4, wherein the module clamp and/or the module coupling structure includes a module lock that is configured to lock the module clamp in at least one of an open position and a closed position.

C7. The tool module of any of paragraphs C1-06.5, wherein the tool module is configured to be supported by a railway and optionally is configured to roll on a railway.

C8. The tool module of any of paragraphs C1-07, further comprising feet structures configured to support the tool module.

C8.1. The tool module of paragraph C8, wherein the feet structures are configured to fit at least one of a railway and the railway rail.

C8.2. The tool module of any of paragraphs C8-C8.1, wherein the feet structures include, optionally are, wheels.

C9. The tool module of any of paragraphs C1-08.2, wherein at least one, optionally each, rail alignment clamp is configured to grip the railway rail across a web of the railway rail and/or under a head of the railway rail.

010. The tool module of any of paragraphs C1-09, wherein each rail alignment clamp includes a rail alignment clamp actuator and at least two opposing rail alignment clamp jaws.

C10.1. The tool module of paragraph C10, wherein the rail alignment clamp actuator includes, optionally is, a hydraulic cylinder.

C10.2. The tool module of any of paragraphs C10-C10.1, wherein at least one, optionally each, rail alignment clamp jaw is pivotably coupled to the frame, optionally to at least one alignment rail of the frame.

C11. The use of the tool module of any of paragraphs C1-C10.2, when also dependent on paragraph C2 to remove and/or to displace ballast from under the railway rail along the clearing path.

C12. The use of the tool module of any of paragraphs C1-C10.2, when also dependent on paragraph C3 to at least one of operate, tighten, loosen, insert, and remove rail bolts located within the longitudinal section of the railway rail.

C13. The use of the tool module of any of paragraphs C1-C10.2, when also dependent on paragraph C4 to form holes in the railway rail within a longitudinal section of the railway rail.

D1. A method for cutting a railway rail, the method comprising:

positioning a cold saw module at a cutting site along a railway rail installed in a railway, optionally wherein the cold saw module is the saw module of any of paragraphs B1-B29.4 when also dependent on paragraph B2;

clamping the cold saw module to the railway rail; and cutting the railway rail at the cutting site with the cold saw module while the cold saw module is clamped to the railway rail.

D2. The method of paragraph D1, wherein the clamping includes clamping the railway rail with one or more rail alignment clamps of the cold saw module, optionally the rail alignment clamps of any of paragraphs A1-A29.

D3. The method of any of paragraphs D1-D2, wherein the clamping includes aligning the cold saw module such that a cold saw of the cold saw module is substantially perpendicular to the railway rail.

D4. The method of any of paragraphs D1-D3, wherein the clamping includes clamping at a clamping site within 100 mm, 200 mm, 300 mm, or 500 mm of the cutting site.

D5. The method of any of paragraphs D1-D4, wherein the clamping includes clamping the railway rail on opposite sides of the cutting site.

D6. The method of any of paragraphs D1-D5, wherein the clamping includes applying up to 2 ton-force (20 kN), up to 5 ton-force (49 kN), up to 10 ton-force (98 kN), up to 20 ton-force (200 kN), up to 40 ton-force (390 kN), greater than 1 ton-force (9.8 kN), greater than 5 ton-force (49 kN), and/or greater than 40 ton-force (390 kN) across the railway rail, optionally across a web of the railway rail.

D7. The method of any of paragraphs D1-D6, wherein the cutting includes cutting transversely through the railway rail.

D8. The method of any of paragraphs D1-D7, wherein the cutting includes cutting substantially perpendicular to the railway rail.

D9. The method of any of paragraphs D1-D8, wherein the cutting includes cutting along a cutting path through the railway rail.

D10. The method of any of paragraphs D1-D9, wherein the cutting includes cutting with a cold saw blade rotating at a speed of less than 500 RPM, less than 200 RPM, less than 100 RPM, less than 80 RPM, less than 50 RPM, less than 30 RPM, greater than 10 RPM, greater than 20 RPM, greater than 30 RPM, greater than 50 RPM, and/or greater than 80 RPM.

D11. The method of any of paragraphs D1-D10, wherein the cutting includes cutting with a cold saw blade operating at a speed of at least 30 SMPM, at least 50 SMPM, at least 80 SMPM, at least 100 SMPM, at least 150 SMPM, at most 300 SMPM, at most 200 SMPM, at most 150 SMPM, at most 100 SMPM, at most 80 SMPM, and/or at most 50 SMPM.

D12. The method of any of paragraphs D1-D11, wherein the cutting includes cutting with a cold saw blade with a diameter of at least 200 mm, at least 300 mm, at least 500 mm, at least 700 mm, at most 1000 mm, at most 800 mm, at most 600 mm, and/or at most 400 mm.

D13. The method of any of paragraphs D1-D12, further comprising connecting the cold saw module to an articulated arm, optionally the articulated arm of any of paragraphs A1-A29.

D13.1. The method of paragraph D13, wherein the positioning includes positioning the cold saw module with the articulated arm.

D13.2. The method of any of paragraphs D13-D13.1, wherein the connecting includes connecting the articulated arm to a tool adapter, optionally the tool adapter of any of paragraphs A1-A29, and connecting the tool adapter to the cold saw module.

D14. The method of any of paragraphs D1-D13.2, wherein the positioning includes positioning the cold saw module with a translating actuator of the cold saw module, optionally the translating actuator of any of paragraphs B1-B29.4.

D15. The method of any of paragraphs D1-D14, further comprising clearing ballast from a clearance space under the railway rail at the cutting site, prior to the cutting.

D15.1. The method of paragraph D15, wherein the clearing ballast includes clearing ballast with a ballast plow mechanism, optionally the ballast plow mechanism of any of paragraphs B1-C10.2.

D15.2. The method of any of paragraphs D15-D15.1, wherein the clearing ballast includes driving a ballast plow under the railway rail along a clearing path.

D15.3. The method of any of paragraphs D15-D15.2, wherein the clearance space has a depth under the railway rail of at most 200 mm, at most 100 mm, at most 50 mm, at least 10 mm, at least 20 mm, and/or at least 40 mm.

D15.4. The method of any of paragraphs D15-D15.3, wherein the clearance space has a width of at most 300 mm, at most 200 mm, at most 100 mm, at least 20 mm, at least 40 mm, and/or at least 60 mm.

D16. The method of any of paragraphs D1-D15.4, further comprising tensioning the railway rail about the cutting site, prior to the cutting.

D16.1. The method of paragraph D16, wherein the tensioning includes applying spreading force of at least 50 ton-force (490 kN), at least 70 ton-force (690 kN), at least 90 ton-force (880 kN), at least 100 ton-force (980 kN), at least 120 ton-force (1200 kN), at least 150 ton-force (1500 kN), and/or at least 180 ton-force (1800 kN) across the cutting site.

D17. The method of any of paragraphs D1-D16.1, wherein the cutting site is a first cutting site and wherein the method includes repeating the method to cut the railway rail at a second cutting site.

D17.1. The method of paragraph D17, further comprising removing a section of railway rail between the first cutting site and the second cutting site after cutting at the first cutting site and cutting at the second cutting site.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the singular forms "a", "an" and "the" may be intended to include the plural forms as well, unless the context clearly indicates otherwise.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

INDUSTRIAL APPLICABILITY

The systems and methods disclosed herein are applicable to the rail transport industry and the construction industry.

The various disclosed elements of systems and steps of methods disclosed herein are not required of all systems, apparatuses, and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system, apparatus, or method. Accordingly, such inventive subject matter is not required to be associated with the specific systems, apparatuses, and methods that are expressly disclosed herein, and such inventive subject matter may find utility in systems, apparatuses, and/or methods that are not expressly disclosed herein.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for cutting a railway rail, the method comprising:
   positioning a cold saw module at a cutting site along a railway rail installed in a railway;
   clamping the cold saw module to the railway rail;
   providing a pair of spreading clamps;
   gripping the railway rail on one side of the cutting path with a first spreading clamp of the pair;
   gripping the railway rail on an opposite side of the cutting path with a second spreading clamp of the pair;
   applying longitudinal tension to the railway rail with the first pair of spreading clamp of the pair in a first direction away from the cutting site;
   applying longitudinal tension to the railway rail with the second spreading clamp of the pair in a second direction opposite the first direction away from the cutting site;
   cutting the railway rail at the cutting site with the cold saw module while the cold saw module is clamped to the railway rail.

2. The method of claim 1, wherein the clamping includes clamping the railway rail on opposite sides of the cutting site.

3. The method of claim 1, wherein the cutting includes cutting with a cold saw blade rotating at a speed of less than 200 revolutions per minute.

4. The method of claim 1, wherein the cold saw module comprises a cold saw having a saw blade and a blade motor mounted to the cold saw wherein the blade motor moves with the cold saw when the cold saw cuts the railway rail.

5. A rail saw module comprising:
- a frame configured to longitudinally span a length of a railway rail;
- a cold saw with a cutting path configured to cut the railway rail transversely at a cutting site of the railway rail, wherein the cold saw is coupled to the frame;
- at least one rail alignment clamp configured to grip the railway rail, wherein the at least one rail alignment clamp is coupled to the frame;
- a pair of spreading clamps with a first spreading clamp of the pair configured to grip the railway rail on one side of the cutting site, and a second spreading clamp of the pair configured to grip the railway rail on an opposite side of the cutting site, the first spreading clamp configured to apply longitudinal tension to the railway rail in a first direction away from the cutting site and the second spreading clamp configured to apply longitudinal tension to the railway rail in a second direction opposite the first direction away from the cutting site;
- a feed actuator configured to drive the cold saw along the cutting path, wherein the feed actuator is coupled to the frame; and
- a module coupling element configured to selectively couple to a mating module coupling element of at least one of an articulated arm and a tool adapter, where the module coupling element is coupled to the frame.

6. The rail saw module of claim 5, wherein the at least one rail alignment clamp is configured to align the cutting path substantially perpendicular to the railway rail while the at least one rail alignment clamp grips the railway rail.

7. The rail saw module of claim 5, wherein each rail alignment clamp is configured to grip the railway rail across a web of the railway rail.

8. The rail saw module of claim 5, wherein the at least one rail alignment clamp includes a first rail alignment clamp on one side of the cutting path and a second rail alignment clamp on an opposite side of the cutting path, wherein each of the first rail alignment clamp and the second rail alignment clamp are within 300 mm of the cutting path.

9. The rail saw module of claim 5, wherein the cold saw includes a saw blade that has a diameter of at least 200 mm and at most 1000 mm.

10. The rail saw module of claim 5, wherein the cold saw includes a blade motor that is a hydraulic motor.

11. The rail saw module of claim 5, wherein the cold saw is configured to rotate a saw blade at a speed of at most 300 surface meters per minute.

12. The rail saw module of claim 5, wherein each rail alignment clamp is configured to grip the railway rail between the pair of spreading clamps.

13. The rail saw module of claim 5, wherein each spreading clamp includes a rail clamp configured to grip the railway rail across a web of the railway rail.

14. The rail saw module of claim 5, wherein each spreading clamp includes a translating actuator configured to translate the spreading clamp along at least one alignment rail of the frame.

15. The rail saw module of claim 5, further comprising a ballast plow mechanism configured to displace ballast from under the railway rail along the cutting path.

16. The rail saw module of claim 15, wherein the ballast plow mechanism includes a ballast plow and a ballast plow actuator, wherein the ballast plow mechanism is configured to drive the ballast plow in an arc under the railway rail, transverse to the railway rail.

17. The rail saw module of claim 16, wherein the ballast plow is configured to collect swarf from the railway rail as the railway rail is cut by the cold saw.

18. A mobile saw module comprising:
- a cold saw with a cutting path configured to cut a metal workpiece transversely at a cutting side of the metal workpiece;
- at least one alignment clamp configured to grip the metal workpiece;
- a pair of spreading clamps with a first spreading clamp of the pair configured to grip the workpiece on one side of the cutting site, and a second spreading clamp of the pair configured to grip the workpiece on an opposite side of the cutting site, the first spreading clamp configured to apply longitudinal tension to the workpiece in a first direction away from the cutting site and the second spreading clamp configured to apply longitudinal tension to the railway rail in a second direction opposite the first direction away from the cutting site;
- a feed actuator configured to drive the cold saw along the cutting path;
- a module coupling element configured to selectively couple to a mating module coupling element of at least one of an articulated arm and a tool adapter; and
- a frame coupled to the cold saw, the at least one alignment clamp, the feed actuator, and the module coupling element;
- wherein the mobile saw module has a mass of less than 200 kg.

19. The mobile saw module of claim 18, wherein the mobile saw module is configured to grab the metal workpiece on opposite sides of the cutting site.

20. The mobile saw module of claim 18, wherein the cold saw is configured to rotate a saw blade at a speed of less than 200 revolutions per minute.

* * * * *